US009186581B2

(12) United States Patent
Araki et al.

(10) Patent No.: US 9,186,581 B2
(45) Date of Patent: *Nov. 17, 2015

(54) COMMUNICATION SYSTEM, INFORMATION PROCESSING APPARATUS, COMPUTER-READABLE STORAGE MEDIUM, AND COMMUNICATION METHOD

(75) Inventors: Tsutomu Araki, Kyoto (JP); Ryutaro Takahashi, Kyoto (JP); Megumi Kurata, Kyoto (JP); Seiji Shibaguchi, Kyoto (JP); Masayoshi Kobayashi, Kyoto (JP); Teruhiko Goda, Kyoto (JP); Eiji Tokunaga, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1040 days.

This patent is subject to a terminal disclaimer.

(21) Appl. No.: 13/230,082

(22) Filed: Sep. 12, 2011

(65) Prior Publication Data

US 2012/0179884 A1 Jul. 12, 2012

(30) Foreign Application Priority Data

Jan. 6, 2011 (JP) .................................. 2011-001525

(51) Int. Cl.
*G06F 9/44* (2006.01)
*A63F 13/30* (2014.01)

(52) U.S. Cl.
CPC ........... *A63F 13/12* (2013.01); *A63F 2300/405* (2013.01); *A63F 2300/552* (2013.01)

(58) Field of Classification Search
None
See application file for complete search history.

(56) References Cited

U.S. PATENT DOCUMENTS

| 5,497,479 | A | 3/1996 | Hornbuckle |
| 7,630,381 | B1 | 12/2009 | Roskind et al. |
| 8,545,336 | B2 | 10/2013 | Miyanaga |
| 2001/0044933 | A1 | 11/2001 | Tagiri et al. |
| 2004/0087369 | A1 | 5/2004 | Tanaka et al. |
| 2005/0055595 | A1 | 3/2005 | Frazer et al. |

(Continued)

FOREIGN PATENT DOCUMENTS

| JP | 11-15654 | 1/1999 |
| JP | 2004-136009 | 5/2004 |

(Continued)

OTHER PUBLICATIONS

Office Action (2 pages) dated Aug. 18, 2014 issued in corresponding Japanese Application No. 2011-001525 and English translation (2 pages).

(Continued)

*Primary Examiner* — Chameli Das
(74) *Attorney, Agent, or Firm* — Nixon & Vanderhye, P.C.

(57) ABSTRACT

Prior to performing download play, it is determined whether or not a slave apparatus program has been already stored in an internal memory of a slave apparatus. When not stored yet, the slave apparatus program is transmitted from a master apparatus to the slave apparatus, and stored in the internal memory of the slave apparatus. When already stored, the slave apparatus program is not transmitted from the master apparatus to the slave apparatus. Then, multiplay is performed by performing mutual communication between the master apparatus operating in accordance with a master apparatus game program and the slave apparatus operating in accordance with a slave apparatus game program. Thus, time and effort for receiving the same application program more than once are omitted, and it is possible to efficiently start a communication process.

13 Claims, 15 Drawing Sheets

(56) References Cited

U.S. PATENT DOCUMENTS

| | | | |
|---|---|---|---|
| 2005/0138177 A1* | 6/2005 | Davis | 709/227 |
| 2005/0159221 A1 | 7/2005 | Kamikawa et al. | |
| 2006/0106963 A1 | 5/2006 | Sasaki et al. | |
| 2006/0136898 A1 | 6/2006 | Bosscha et al. | |
| 2007/0037625 A1 | 2/2007 | Edwards | |
| 2009/0088247 A1 | 4/2009 | Oberg et al. | |
| 2009/0088259 A1 | 4/2009 | Gosztyla et al. | |
| 2009/0172659 A1* | 7/2009 | Oberg et al. | 717/178 |
| 2010/0042920 A1* | 2/2010 | Sigal | 715/704 |
| 2010/0115177 A1* | 5/2010 | Bryant-Rich et al. | 711/103 |
| 2010/0144430 A1 | 6/2010 | Graham et al. | |
| 2010/0299712 A1 | 11/2010 | Austin et al. | |
| 2011/0276609 A1* | 11/2011 | Denison | 707/812 |
| 2011/0289123 A1* | 11/2011 | Denison | 707/812 |
| 2012/0250512 A1* | 10/2012 | Jagadeeswaran et al. | 370/235.1 |
| 2014/0250015 A1* | 9/2014 | Lemay et al. | 705/44 |

FOREIGN PATENT DOCUMENTS

| | | |
|---|---|---|
| JP | 3679111 | 5/2005 |
| JP | 3699471 | 7/2005 |
| JP | 3790257 | 4/2006 |
| JP | 3790261 | 4/2006 |
| JP | 3790263 | 4/2006 |
| JP | 3790264 | 4/2006 |
| JP | 3874785 | 11/2006 |
| JP | 2008-012071 | 1/2008 |
| JP | 4324487 | 6/2009 |
| JP | 4456611 | 2/2010 |
| JP | 2010-213966 | 9/2010 |
| WO | 02/25438 | 3/2002 |
| WO | 2004/025655 | 3/2004 |
| WO | 2008/063579 | 5/2008 |

OTHER PUBLICATIONS

Office Action (34 pgs.) dated May 23, 2014 issued in co-pending U.S. Appl. No. 13/230,159.

Office Action (3 pages) dated Jun. 30, 2014 issued in corresponding Japanese Application No. 2011-001526 and English translation (3 pages).

Office Action (48 pgs.) dated Jan. 2, 2015 issued in copending U.S. Appl. No. 13/230,159.

* cited by examiner

COMMUNICATION SYSTEM, INFORMATION PROCESSING APPARATUS, COMPUTER-READABLE STORAGE MEDIUM, AND COMMUNICATION METHOD

CROSS REFERENCE TO RELATED APPLICATION

The disclosure of Japanese Patent Application No. 2011-001525, filed on Jan. 6, 2011, is incorporated herein by reference.

BACKGROUND OF THE INVENTION

1. Field of the Invention

The present invention relates to a communication system, an information processing apparatus, a computer-readable storage medium, and a communication method, and, in particular, relates to a communication system, an information processing apparatus, a computer-readable storage medium, and a communication method, for performing a predetermined communication process between a plurality of information processing apparatuses that are communicable with each other.

2. Description of the Background Art

Conventionally, there is known a game system that allows a plurality of hand-held game apparatuses or video game apparatuses to communicate with each other. A game apparatus used in such a game system has a communication means for communicating with other game apparatuses and communication apparatuses, and obtains game data and the like from another game apparatus by using the communication means in the process in which a game program is executed by a CPU, thereby playing a communicative game.

However, in order to play a communicative game between a plurality of game apparatuses, a game program for the communicative game has to be prepared for each game apparatus.

Therefore, techniques disclosed in Japanese Patent Nos. 3679111, 3699471, 3790257, 3790261, 3790263, 3790264, 4456611, 3874785, and 4324487 (Patent Documents 1 to 9) have been proposed, in which, even when a game program is not prepared, a communicative game can be played by receiving a game program from another game apparatus. Specifically, a game apparatus that does not have a game program downloads the game program from another game apparatus that has the game program, and executes the game program, thereby executing a communicative game based on the game program downloaded from the other game apparatus.

However, in Patent Documents 1 to 9, the game program received from the other game apparatus is expanded on a volatile working RAM, and executed. Thus, when the game apparatus is powered off, the received game program disappears due to the characteristics of the RAM. Therefore, each time the user starts the communicative game, the user needs to perform a transmission/reception operation. As a result, a burden is imposed on the user, and there is inconvenience that the user cannot immediately start the communicative game.

SUMMARY OF THE INVENTION

Therefore, an object of the present invention is to provide a communication system, an information processing apparatus, a computer-readable storage medium, and a communication method, which make it unnecessary to receive the same application program more than once and which allow a communication process to be efficiently started.

The present invention has the following features to attain the object mentioned above.

One example of a communication system of the present invention is a communication system including a first information processing apparatus and a second information processing apparatus that are communicable with each other.

The first information processing apparatus comprises application program storage means, application program transmission means, and first communication process means. The application program storage means stores an application program for performing a predetermined communication process between the first information processing apparatus and the second information processing apparatus. The application program transmission means transmits the application program to the second information processing apparatus in accordance with a request from the second information processing apparatus. The first communication process means performs the communication process with the second information processing apparatus.

The second information processing apparatus comprises a nonvolatile memory, first determination means, application program reception means, application program storing means, and second communication process means. The first determination means determines whether or not the application program has been already stored in the nonvolatile memory. The application program reception means receives the application program from the first information processing apparatus when the first determination means determines that the application program has not been stored in the nonvolatile memory. The application program storing means stores the application program received by the application program reception means, in the nonvolatile memory. The second communication process means performs the communication process with the first information processing apparatus by using the application program stored in the nonvolatile memory.

In another example, when the first determination means determines that the application program has been already stored in the nonvolatile memory, the second communication process means may perform the communication process with the first information processing apparatus by using the already-stored application program.

In still another example, the first information processing apparatus and the second information processing apparatus may be portable information processing apparatuses that are communicable with each other by short-range wireless communication.

In still another example, the first information processing apparatus may be an information processing apparatus that invites participation in the communication process with respect to another information processing apparatus, and the second information processing apparatus may be an information processing apparatus that participates in the communication process in response to the invitation. When the first determination means determines that the application program has been already stored in the nonvolatile memory, or when the application program received by the application program reception means is stored in the nonvolatile memory by the application program storing means, the first communication process means and the second communication process means may perform the communication process.

In still another example, the first information processing apparatus may further comprise identification information transmission means for transmitting identification information of the application program, and the first determination means may determine whether or not the application program has been already stored in the nonvolatile memory, by comparing the identification information transmitted by the identification information transmission means to identification information of the application program stored in the nonvolatile memory.

According to the above examples, it can be easily determined whether or not the application program has been already stored, without time and effort of the user.

In still another example, the second information processing apparatus may further comprise request signal transmission means for transmitting a request signal for requesting the application program to the first information processing apparatus, when the first determination means determines that the application program has not been stored in the nonvolatile memory. When the request signal transmitted by the request signal transmission means is received, the application program transmission means may transmit the application program to the second information processing apparatus.

According to the above example, the second information processing apparatus requests the application program from the first information processing apparatus only when needed, and receives the application program from the first information processing apparatus. Thus, an efficient communication process is possible.

In still another example, the second information processing apparatus may further comprise: second determination means for determining whether or not another application program that is previously received by the application program reception means and that is different from the application program has been stored in the nonvolatile memory; and first deletion means for deleting the other application program when the second determination means determines that the other application program has been stored in the nonvolatile memory. After the deletion is performed by the first deletion means, the application program storing means may store the application program received by the application program reception means.

According to the above examples, the free space of the nonvolatile memory can be prevented from being reduced each time a new application program is received.

In still another example, the second information processing apparatus may further comprise: free space determination means for determining whether or not the nonvolatile memory has a free space for storing the application program received by the application program reception means; and second deletion means for, when the free space determination means determines that the nonvolatile memory does not have the free space, deleting the application program stored in the nonvolatile memory, on the basis of a predetermined criterion until the free space is secured. The application program storing means may store the application program after the deletion is performed by the second deletion means.

According to the above example, even when the free space of the nonvolatile memory is insufficient, it is possible to store a new application program and to perform the communication process.

In still another example, the second information processing apparatus may further comprise: identification information reception means for receiving identification information of the application program from the first information processing apparatus; and third determination means for determining whether or not the identification information received by the identification information reception means agrees with the identification information of the application program stored in the nonvolatile memory. When the third determination means determines that the identification information received by the identification information reception means agrees with the identification information of the application program stored in the nonvolatile memory, the second communication process means may perform the communication process with the first information processing apparatus by using the application program stored in the nonvolatile memory.

According to the above example, since the application program cannot be successfully executed unless it is in a state where it is possible to communicate with the first information processing apparatus, communication between the first information processing apparatus and the second information processing apparatus (namely, interaction between users) can be prompted. In addition, a situation can be prevented in which an information processing apparatus that does not have an original application program can execute the application program received from another information processing apparatus, on its own without performing communication with the other information processing apparatus.

In still another example, the application program stored in the nonvolatile memory may be an application program that cannot be executed voluntarily In still another example, the application program storing means may store the application program received by the application program reception means such that the application program is identifiable from another application program. The second information processing apparatus may further comprise: list display means for displaying a list of application programs other than the application program received by the application program reception means; selection means for selecting one application program from among the application programs displayed by the list display means, on the basis of an instruction from a user; and application execution means for executing the application program selected by the selection means.

According to the above examples, the application program received by the second information processing apparatus from the first information processing apparatus cannot be selected by the user and executed, and it is necessary to perform communication with the first information processing apparatus in order to execute the application program. Thus, communication between the first information processing apparatus and the second information processing apparatus (namely, interaction between users) can be prompted. In addition, a situation can be prevented in which an information processing apparatus that does not have an original application program can execute the application program received from another information processing apparatus, on its own without performing communication with the other information processing apparatus.

One example of an information processing apparatus of the present invention is an information processing apparatus communicable with another information processing apparatus. The information processing apparatus comprises: a nonvolatile memory; first determination means for determining whether or not an application program for performing a predetermined communication process with the other information processing apparatus has been already stored in the nonvolatile memory; application program reception means for receiving the application program from the other information processing apparatus when the first determination means determines that the application program has not been stored in the nonvolatile memory; application program storing means for storing the application program received by the application program reception means, in the nonvolatile memory; and communication process means for performing the communication process with the other information processing apparatus by using the application program stored in the nonvolatile memory.

One example of a computer-readable storage medium of the present invention is a computer-readable storage medium having stored therein a communication program for causing a computer of an information processing apparatus having a nonvolatile memory to operate as: first determination means for determining whether or not an application program for performing a predetermined communication process with another information processing apparatus has been already stored in the nonvolatile memory; application program reception means for receiving the application program from the other information processing apparatus when the first determination means determines that the application program has not been stored in the nonvolatile memory; application program storing means for storing the application program received by the application program reception means, in the nonvolatile memory; and communication process means for performing the communication process with the other information processing apparatus by using the application program stored in the nonvolatile memory.

One example of a communication method of the present invention is a communication method for performing a predetermined communication process between a first information processing apparatus and a second information processing apparatus that are communicable with each other. The communication method comprises: a step of determination means of the second information processing apparatus determining whether or not an application program for performing the communication process with the first information processing apparatus has been already stored in a nonvolatile memory of the second information processing apparatus; a step of application program transmission means of the first information processing apparatus transmitting the application program to the second information processing apparatus in accordance with a request from the second information processing apparatus, when the determination means determines that the application program has not been stored in the nonvolatile memory; a step of application program reception means of the second information processing apparatus receiving the application program from the first information processing apparatus; a step of application program storing means of the second information processing apparatus storing the application program received by the application program reception means, in the nonvolatile memory; and a step of communication process means of the second information processing apparatus performing the communication process with the first information processing apparatus by using the application program stored in the nonvolatile memory.

According to the present invention, when an application program is downloaded once, a reception process can be omitted the next time and later. Thus, time and effort for receiving the same application program more than once can be omitted, and it is possible to efficiently start a communication process.

These and other objects, features, aspects and advantages of the present invention will become more apparent from the following detailed description of the present invention when taken in conjunction with the accompanying drawings.

DESCRIPTION OF THE PREFERRED EMBODIMENTS (Structure of Game Apparatus)

Figure 1:
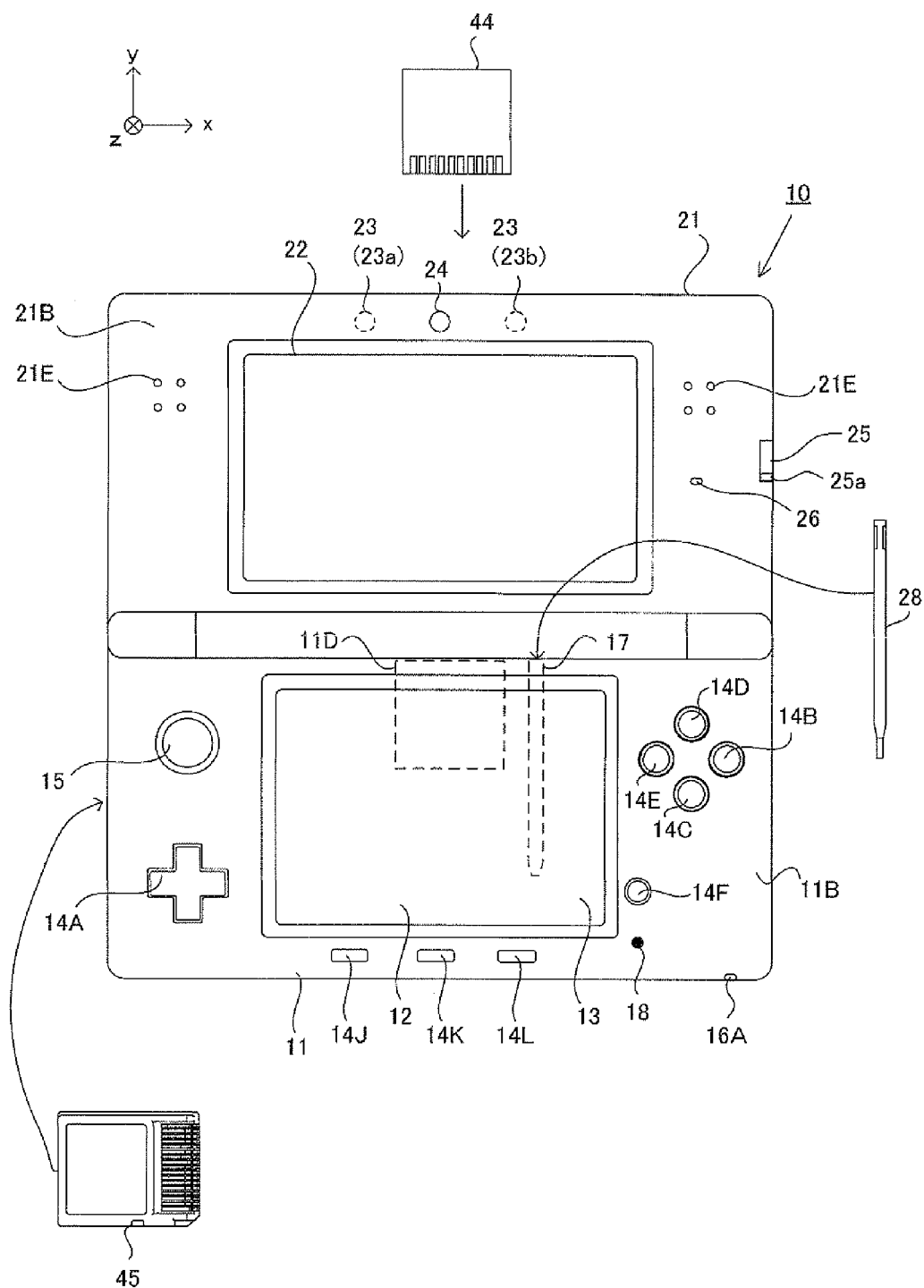
FIG. 1 is a front view of a game apparatus 10 in its opened state.

Hereinafter, a game apparatus according to one embodiment of the present invention will be described. FIG. 1 and FIGS. 2A to 2D are each a plan view of an outer appearance of a game apparatus 10. The game apparatus 10 is a hand-held game apparatus, and is configured to be foldable as shown in FIG. 1 and FIGS. 2A to 2D. FIG. 1 shows the game apparatus 10 in an opened state, and FIGS. 2A to 2D shows the game apparatus 10 in a closed state. FIG. 1 is a front view of the game apparatus 10 in the opened state. The game apparatus 10 is able to take an image by means of an imaging section, display the taken image on a screen, and store data of the taken image. The game apparatus 10 can execute a game program which is stored in an exchangeable memory card or a game program which is received from a server or another game apparatus, and can display, on the screen, an image generated by computer graphics processing, such as an image taken by a virtual camera set in a virtual space, for example.

Initially, an external structure of the game apparatus 10 will be described with reference to FIG. 1 and FIGS. 2A to 2D. The game apparatus 10 includes a lower housing 11 and an upper housing 21 as shown in FIG. 1 and FIGS. 2A to 2D. The lower housing 11 and the upper housing 21 are connected to each other so as to be openable and closable (foldable).

(Description of Lower Housing)

Initially, a structure of the lower housing 11 will be described. As shown in FIG. 1 and FIGS. 2A to 2D, in the lower housing 11, a lower LCD (Liquid Crystal Display) 12, a touch panel 13, operation buttons 14A to 14L, an analog stick 15, an LED 16A and an LED 16B, an insertion opening 17, and a microphone hole 18 are provided. Hereinafter, these components will be described in detail.

As shown in FIG. 1, the lower LCD 12 is accommodated in the lower housing 11. The number of pixels of the lower LCD 12 may be, for example, 256 dots×192 dots (the longitudinal line×the vertical line). The lower LCD 12 is a display device for displaying an image in a planar manner (not in a stereoscopically visible manner), which is different from the upper LCD 22 as described below. Although an LCD is used as a display device in the present embodiment, any other display device such as a display device using an EL (Electro Luminescence), or the like may be used. In addition, a display device having any resolution may be used as the lower LCD 12.

As shown in FIG. 1, the game apparatus 10 includes the touch panel 13 as an input device. The touch panel 13 is mounted on the screen of the lower LCD 12. In the present embodiment, the touch panel 13 may be, but is not limited to, a resistive film type touch panel. A touch panel of any type such as electrostatic capacitance type may be used. In the present embodiment, the touch panel 13 has the same resolution (detection accuracy) as that of the lower LCD 12. However, the resolution of the touch panel 13 and the resolution of the lower LCD 12 may not necessarily be the same. Further, the insertion opening 17 (indicated by dashed line in FIG. 1 and FIG. 2D) is provided on the upper side surface of the lower housing 11. The insertion opening 17 is used for accommodating a touch pen 28 which is used for performing an operation on the touch panel 13. Although an input on the touch panel 13 is usually made by using the touch pen 28, a finger of a user may be used for making an input on the touch panel 13, in addition to the touch pen 28.

The operation buttons 14A to 14L are each an input device for making a predetermined input. As shown in FIG. 1, among operation buttons 14A to 14L, a cross button 14A (a direction input button 14A), a button 14B, a button 14C, a button 14D, a button 14E, a power button 14F, a selection button 14J, a HOME button 14K, and a start button 14L are provided on the inner side surface (main surface) of the lower housing 11. The cross button 14A is cross-shaped, and includes buttons for indicating an upward, a downward, a leftward, or a rightward direction. The button 14A to 14E, the selection button 14J, the HOME button 14K, and the start button 14L are assigned functions, respectively, in accordance with a program executed by the game apparatus 10, as necessary. For example, the cross button 14A is used for selection operation and the like, and the operation buttons 14B to 14E are used for, for example, determination operation and cancellation operation. The power button 14F is used for powering the game apparatus 10 on/off.

The analog stick 15 is a device for indicating a direction. The analog stick 15 has a top, corresponding to a key, which slides parallel to the inner side surface of the lower housing 11. The analog stick 15 acts in accordance with a program executed by the game apparatus 10. For example, when a game in which a predetermined object appears in a three-dimensional virtual space is executed by the game apparatus 10, the analog stick 15 acts as an input device for moving the predetermined object in the three-dimensional virtual space. In this case, the predetermined object is moved in a direction in which the top corresponding to the key of the analog stick 15 slides. As the analog stick 15, a component which enables an analog input by being tilted by a predetermined amount, in any direction, such as the upward, the downward, the rightward, the leftward, or the diagonal direction, may be used.

Further, the microphone hole 18 is provided on the inner side surface of the lower housing 11. Under the microphone hole 18, a microphone 42 (see FIG. 3) is provided as a sound input device described below, and the microphone 42 detects for a sound from the outside of the game apparatus 10.

Figure 2A:
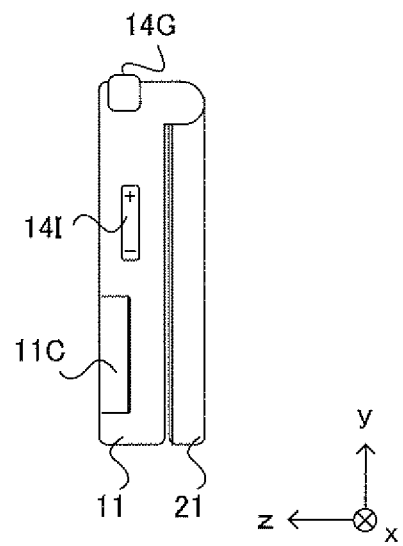
FIG. 2A is a left side view of the game apparatus 10 in its closed state.
Figure 2B:
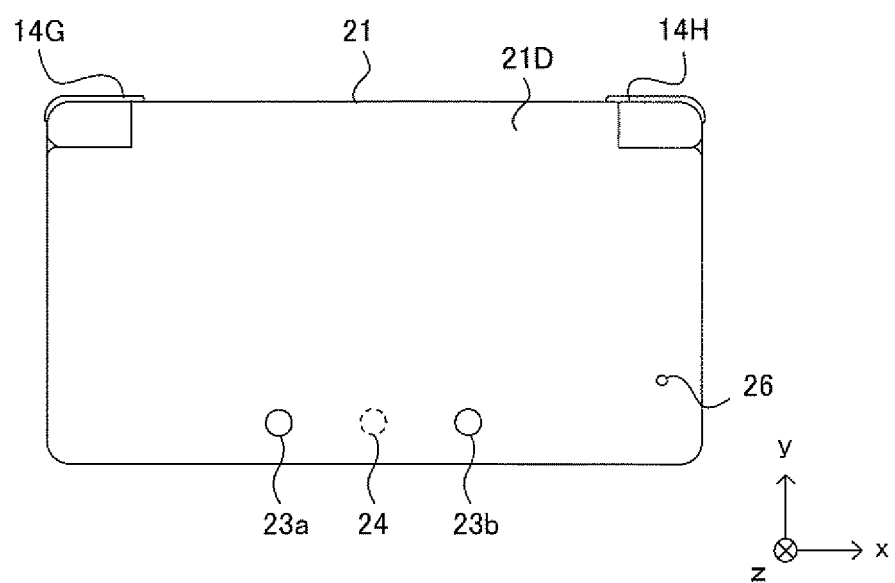
FIG. 2B is a front side view of the game apparatus 10 in its closed state.
Figure 2C:
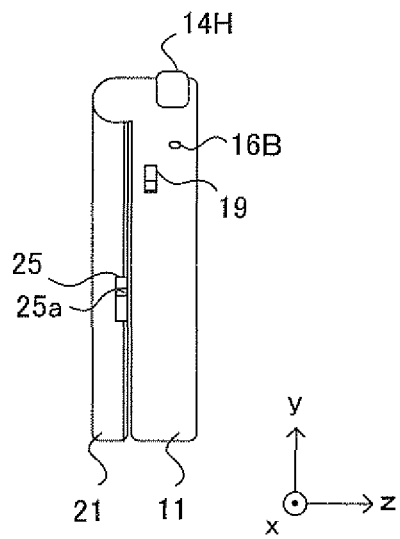
FIG. 2C is a right side view of the game apparatus 10 in its closed state.
Figure 2D:
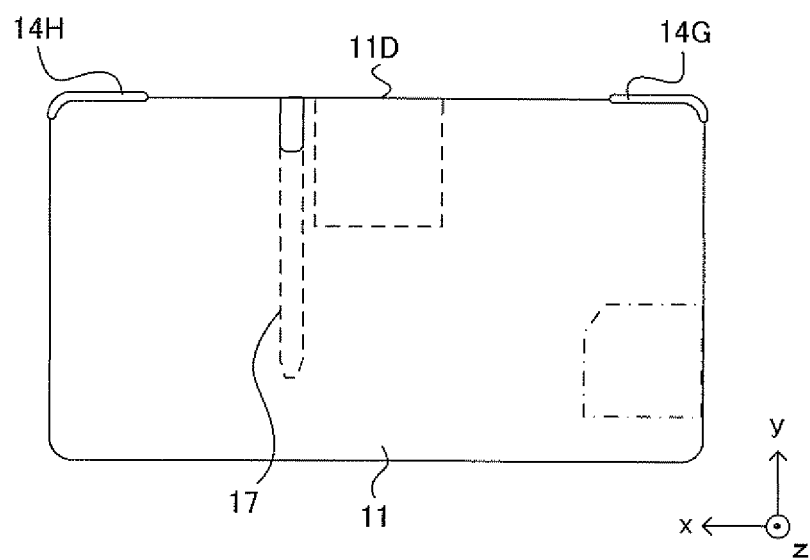
FIG. 2D is a rear side view of the game apparatus 10 in its closed state.

FIG. 2A is a left side view of the game apparatus 10 in the closed state. FIG. 2B is a front view of the game apparatus 10 in the closed state. FIG. 2C is a right side view of the game apparatus 10 in the closed state. FIG. 2D is a rear view of the game apparatus 10 in the closed state. As shown in FIG. 2B and FIG. 2D, an L button 14G and an R button 14H are provided on the upper side surface of the lower housing 11 The L button 14G and the R button 14H can act as, for example, shutter buttons (imaging instruction buttons) of the imaging section. Further, as shown in FIG. 2A, a sound volume button 14I is provided on the left side surface of the lower housing 11. The sound volume button 14I is used for adjusting a sound volume of a speaker of the game apparatus 10.

As shown in FIG. 2A, a cover section 11C is provided on the left side surface of the lower housing 11 so as to be openable and closable. Inside the cover section 11C, a connector (not shown) is provided for electrically connecting between the game apparatus 10 and an external data storage memory 45. The external data storage memory 45 is detachably connected to the connector. The external data storage memory 45 is used for, for example, recording (storing) data of an image taken by the game apparatus 10.

Further, as shown in FIG. 2D, an insertion opening 11D through which an external memory 44 having a game program stored therein is inserted is provided on the upper side surface of the lower housing 11. A connector (not shown) for electrically connecting between the game apparatus 10 and the external memory 44 in a detachable manner is provided inside the insertion opening 11D. A predetermined game program is executed by connecting the external memory 44 to the game apparatus 10.

Further, as shown in FIG. 1 and FIG. 2C, a first LED 16A for notifying a user of an ON/OFF state of a power supply of the game apparatus 10 is provided on the lower side surface of the lower housing 11, and a second LED 16B for notifying a user of an establishment state of a wireless communication of the game apparatus 10 is provided on the right side surface of the lower housing 11. The game apparatus 10 can make wireless communication with other devices, and the second LED 16B is lit up when the wireless communication is established. The game apparatus 10 has a function of connecting to a wireless LAN in a method based on, for example, IEEE802.11.b/g standard. A wireless switch 19 for enabling/disabling the function of the wireless communication is provided on the right side surface of the lower housing 11 (see FIG. 2C).

A rechargeable battery (not shown) acting as a power supply for the game apparatus 10 is accommodated in the lower housing 11, and the battery can be charged through a terminal provided on a side surface (for example, the upper side surface) of the lower housing 11.

(Description of Upper Housing)

Next, a structure of the upper housing 21 will be described. As shown in FIG. 1 and FIGS. 2A to 2D, in the upper housing 21, an upper LCD (Liquid Crystal Display) 22, an outer imaging section 23 (an outer imaging section (left) 23a and an outer imaging section (right) 23b), an inner imaging section 24, a 3D adjustment switch 25, and a 3D indicator 26 are provided. Hereinafter, theses components will be described in detail.

As shown in FIG. 1, the upper LCD 22 is accommodated in the upper housing 21. The number of pixels of the upper LCD 22 may be, for example, 640 dots×200 dots (the horizontal line×the vertical line). Although, in the present embodiment, the upper LCD 22 is an LCD, a display device using an EL (Electro Luminescence), or the like may be used. In addition, a display device having any resolution may be used as the upper LCD 22.

The upper LCD 22 is a display device capable of displaying a stereoscopically visible image. Further, in the present embodiment, an image for a left eye and an image for a right eye are displayed by using substantially the same display area. Specifically, the upper LCD 22 may be a display device using a method in which the image for a left eye and the image for a right eye are alternately displayed in the horizontal direction in predetermined units (for example, every other line). Alternatively, a display device using a method in which the image for a left eye and the image for a right eye are alternately displayed for a predetermined time period may be used. Further, in the present embodiment, the upper LCD 22 is a display device capable of displaying an image which is stereoscopically visible with naked eyes. A lenticular lens type display device or a parallax barrier type display device is used which enables the image for a left eye and the image for a right eye, which are alternately displayed in the horizontal direction, to be separately viewed by the left eye and the right eye, respectively. In the present embodiment, the upper LCD 22 of a parallax barrier type is used. The upper LCD 22 displays, by using the image for a right eye and the image for a left eye, an image (a stereoscopic image) which is stereoscopically visible with naked eyes. That is, the upper LCD 22 allows a user to view the image for a left eye with her/his left eye, and the image for a right eye with her/his right eye by utilizing a parallax barrier, so that a stereoscopic image (a stereoscopically visible image) exerting a stereoscopic effect for a user can be displayed. Further, the upper LCD 22 may disable the parallax barrier. When the parallax barrier is disabled, an image can be displayed in a planar manner (it is possible to display a planar visible image which is different from a stereoscopically visible image as described above. Specifically, a display mode is used in which the same displayed image is viewed with a left eye and a right eye.). Thus, the upper LCD 22 is a display device capable of switching between a stereoscopic display mode for displaying a stereoscopically visible image and a planar display mode (for displaying a planar visible image) for displaying an image in a planar manner. The switching of the display mode is performed by the 3D adjustment switch 25 described below.

Two imaging sections (23a and 23b) provided on the outer side surface (the back surface reverse of the main surface on which the upper LCD 22 is provided) 21D of the upper housing 21 are generically referred to as the outer imaging section 23. The imaging directions of the outer imaging section (left) 23a and the outer imaging section (right) 23b are each the same as the outward normal direction of the outer side surface 21D. The outer imaging section (left) 23a and the outer imaging section (right) 23b can be used as a stereo camera depending on a program executed by the game apparatus 10. Each of the outer imaging section (left) 23a and the outer imaging section (right) 23b includes an imaging device, such as a CCD image sensor or a CMOS image sensor, having a common predetermined resolution, and a lens. The lens may have a zooming mechanism.

The inner imaging section 24 is positioned on the inner side surface (main surface) 21B of the upper housing 21, and acts as an imaging section which has an imaging direction which is the same direction as the inward normal direction of the inner side surface. The inner imaging section 24 includes an imaging device, such as a CCD image sensor and a CMOS image sensor, having a predetermined resolution, and a lens. The lens may have a zooming mechanism.

The 3D adjustment switch 25 is a slide switch, and is used for switching a display mode of the upper LCD 22 as described above. Further, the 3D adjustment switch 25 is used for adjusting the stereoscopic effect of a stereoscopically visible image (stereoscopic image) which is displayed on the upper LCD 22. A slider 25a of the 3D adjustment switch 25 is slidable to any position in a predetermined direction (along the longitudinal direction of the right side surface), and a display mode of the upper LCD 22 is determined in accordance with the position of the slider 25a. Moreover, a manner in which the stereoscopic image is visible is adjusted in accordance with the position of the slider 25a. Specifically, an amount of deviation in the horizontal direction between a position of an image for a right eye and a position of an image for a left eye is adjusted in accordance with the position of the slider 25a.

The 3D indicator 26 indicates whether or not the upper LCD 22 is in the stereoscopic display mode. The 3D indicator 26 is implemented as a LED, and is lit up when the stereoscopic display mode of the upper LCD 22 is enabled. Note that the 3D indicator 26 may be lit up only when the upper LCD 22 is in the stereoscopic display mode and program processing for displaying a stereoscopically visible image is performed.

Further, a speaker hole 21E is provided on the inner side surface of the upper housing 21. A sound is outputted through the speaker hole 21E from a speaker 43 described below.

(Internal Configuration of Game Apparatus 10)

Figure 3:
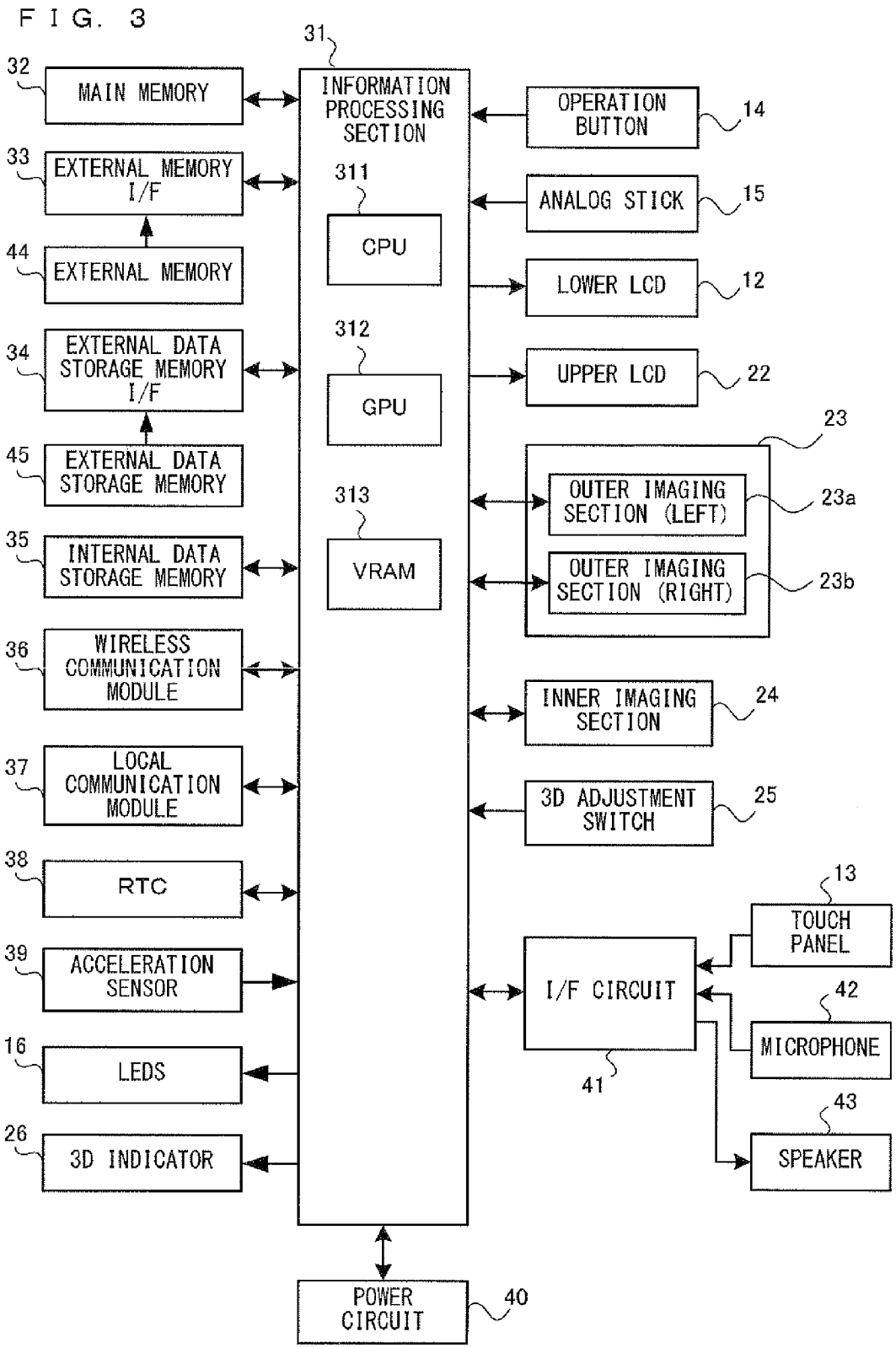
FIG. 3 is a block diagram illustrating an internal configuration of the game apparatus 10.

Next, an internal electrical configuration of the game apparatus 10 will be described with reference to FIG. 3. FIG. 3 is a block diagram illustrating an internal configuration of the game apparatus 10. As shown in FIG. 3, the game apparatus 10 includes, in addition to the components described above, electronic components such as an information processing section 31, a main memory 32, an external memory interface (external memory I/F) 33, an external data storage memory I/F 34, an internal data storage memory 35, a wireless communication module 36, a local communication module 37, a real-time clock (RTC) 38, an acceleration sensor 39, a power supply circuit 40, an interface circuit (I/F circuit) 41, and the like. These electronic components are mounted on an electronic circuit substrate, and accommodated in the lower housing 11 (or the upper housing 21).

The information processing section 31 is information processing means which includes a CPU (Central Processing Unit) 311 for executing a predetermined program, a GPU (Graphics Processing Unit) 312 for performing image processing, and the like.

By executing a predetermined program stored in a memory (for example, the external memory 44 connected to the external memory I/F 33 or the internal data storage memory 35)

inside the game apparatus 10, the CPU 311 of the information processing section 31 performs a process corresponding to this program. The program executed by the CPU 311 of the information processing section 31 may be acquired from another device through communication with the other device. The information processing section 31 further includes a VRAM (Video RAM) 313. The GPU 312 of the information processing section 31 generates an image in accordance with an instruction from the CPU 311 of the information processing section 31, and renders the image in the VRAM 313. The GPU 312 of the information processing section 31 outputs the image rendered in the VRAM 313, to the upper LCD 22 and/or the lower LCD 12, and the image is displayed on the upper LCD 22 and/or the lower LCD 12.

To the information processing section 31, the main memory 32, the external memory I/F 33, the external data storage memory I/F 34, and the internal data storage memory 35 are connected. The external memory I/F 33 is an interface for detachably connecting to the external memory 44. The external data storage memory I/F 34 is an interface for detachably connecting to the external data storage memory 45.

The main memory 32 is volatile storage means used as a work area and a buffer area for (the CPU 311 of) the information processing section 31. That is, the main memory 32 temporarily stores various types of data used for the process based on the above program, and temporarily stores a program acquired from the outside (the external memory 44, another device, or the like), for example. In the present embodiment, for example, a PSRAM (Pseudo-SRAM) is used as the main memory 32.

The external memory 44 is nonvolatile storage means for storing a program executed by the information processing section 31. The external memory 44 is implemented as, for example, a read-only semiconductor memory. When the external memory 44 is connected to the external memory I/F 33, the information processing section 31 can load a program stored in the external memory 44. A predetermined process is performed by the program loaded by the information processing section 31 being executed. The external data storage memory 45 is implemented as a non-volatile readable and writable memory (for example, a NAND flash memory), and is used for storing predetermined data. For example, images taken by the outer imaging section 23 and/or images taken by another device are stored in the external data storage memory 45. When the external data storage memory 45 is connected to the external data storage memory I/F 34, the information processing section 31 loads an image stored in the external data storage memory 45, and the image can be displayed on the upper LCD 22 and/or the lower LCD 12.

The internal data storage memory 35 is implemented as a non-volatile readable and writable memory (for example, a NAND flash memory), and is used for storing predetermined data. For example, data and/or programs downloaded through the wireless communication module 36 by wireless communication is stored in the internal data storage memory 35.

The wireless communication module 36 has a function of connecting to a wireless LAN by using a method based on, for example, IEEE 802.11.b/g standard. The local communication module 37 has a function of performing wireless communication with the same type of game apparatus in a predetermined communication method (for example, communication based on a unique protocol, infrared communication). The wireless communication module 36 and the local communication module 37 are connected to the information processing section 31. The information processing section 31 can perform data transmission to and data reception from another device through the Internet by using the wireless communication module 36, and can perform data transmission to and data reception from the same type of another game apparatus by using the local communication module 37.

The acceleration sensor 39 is connected to the information processing section 31. The acceleration sensor 39 detects magnitudes of accelerations (linear accelerations) in the directions of the straight lines along the three axial (xyz axial) directions, respectively. The acceleration sensor 39 is provided inside the lower housing 11. In the acceleration sensor 39, as shown in FIG. 1, the long side direction of the lower housing 11 is defined as x axial direction, the short side direction of the lower housing 11 is defined as y axial direction, and the direction orthogonal to the inner side surface (main surface) of the lower housing 11 is defined as z axial direction, thereby detecting magnitudes of the linear accelerations for the respective axes. The acceleration sensor 39 is, for example, an electrostatic capacitance type acceleration sensor. However, another type of acceleration sensor may be used. The acceleration sensor 39 may be an acceleration sensor for detecting a magnitude of an acceleration for one axial direction or two-axial directions. The information processing section 31 can receive data (acceleration data) representing accelerations detected by the acceleration sensor 39, and detect an orientation and a motion of the game apparatus 10.

The RTC 38 and the power supply circuit 40 are connected to the information processing section 31. The RTC 38 counts time, and outputs the time to the information processing section 31. The information processing section 31 calculates a current time (date) based on the time counted by the RTC 38. The power supply circuit 40 controls power from the power supply (the rechargeable battery accommodated in the lower housing 11 as described above) of the game apparatus 10, and supplies power to each component of the game apparatus 10.

The I/F circuit 41 is connected to the information processing section 31. The microphone 42 and the speaker 43 are connected to the I/F circuit 41. Specifically, the speaker 43 is connected to the I/F circuit 41 through an amplifier which is not shown. The microphone 42 detects a voice from a user, and outputs a sound signal to the I/F circuit 41. The amplifier amplifies a sound signal outputted from the I/F circuit 41, and a sound is outputted from the speaker 43. The touch panel 13 is connected to the I/F circuit 41. The I/F circuit 41 includes a sound control circuit for controlling the microphone 42 and the speaker 43 (amplifier), and a touch panel control circuit for controlling the touch panel. The sound control circuit performs A/D conversion and D/A conversion on the sound signal, and converts the sound signal to a predetermined form of sound data, for example. The touch panel control circuit generates a predetermined form of touch position data based on a signal outputted from the touch panel 13, and outputs the touch position data to the information processing section 31. The touch position data represents a coordinate of a position, on an input surface of the touch panel 13, on which an input is made. The touch panel control circuit reads a signal outputted from the touch panel 13, and generates the touch position data every predetermined time. The information processing section 31 acquires the touch position data, to recognize a position on which an input is made on the touch panel 13.

The operation button 14 includes the operation buttons 14A to 14L described above, and is connected to the information processing section 31. Operation data representing an input state of each of the operation buttons 14A to 14I is outputted from the operation button 14 to the information processing section 31, and the input state indicates whether or not each of the operation buttons 14A to 14I has been pressed. The information processing section 31 acquires the operation data from the operation button 14 to perform a process in accordance with the input on the operation button 14.

The lower LCD 12 and the upper LCD 22 are connected to the information processing section 31. The lower LCD 12 and the upper LCD 22 each display an image in accordance with an instruction from (the GPU 312 of) the information processing section 31. In the present embodiment, the information processing section 31 causes the lower LCD 12 to display a stereoscopic image (a stereoscopically visible image).

Specifically, the information processing section 31 is connected to an LCD controller (not shown) of the upper LCD 22, and causes the LCD controller to set the parallax barrier to ON or OFF. When the parallax barrier is set to ON in the upper LCD 22, an image for a right eye and an image for a left eye which are stored in the VRAM 313 of the information processing section 31 are outputted to the upper LCD 22. More specifically, the LCD controller alternately repeats reading of pixel data of the image for a right eye for one line in the vertical direction, and reading of pixel data of the image for a left eye for one line in the vertical direction, thereby reading, from the VRAM 313, the image for a right eye and the image for a left eye. Thus, an image to be displayed is divided into the images for a right eye and the images for a left eye each of which is a rectangle-shaped image having one line of pixels aligned in the vertical direction, and an image, in which the rectangle-shaped image for the left eye which is obtained through the division, and the rectangle-shaped image for the right eye which is obtained through the division are alternately aligned, is displayed on the screen of the upper LCD 22. A user views the images through the parallax barrier in the upper LCD 22, so that the image for the right eye is viewed by the user's right eye, and the image for the left eye is viewed by the user's left eye. Thus, the stereoscopically visible image is displayed on the screen of the upper LCD 22.

The outer imaging section 23 and the inner imaging section 24 are connected to the information processing section 31. The outer imaging section 23 and the inner imaging section 24 each take an image in accordance with an instruction from the information processing section 31, and output data of the taken image to the information processing section 31.

The 3D adjustment switch 25 is connected to the information processing section 31. The 3D adjustment switch 25 transmits, to the information processing section 31, an electrical signal in accordance with the position of the slider 25a.

The 3D indicator 26 is connected to the information processing section 31. The information processing section 31 controls whether or not the 3D indicator 26 is to be lit up. For example, the information processing section 31 lights up the 3D indicator 26 when the upper LCD 22 is in the stereoscopic display mode. The game apparatus 10 has the internal configuration as described above.

(Outline of Game System)

The game apparatus 10 can communicate with other game apparatuses 10 present in the vicinity of the game apparatus 10, by short-range wireless communication through the local wireless communication module 37. By using such short-range wireless communication, multiplay is possible in which a plurality of users each having a game apparatus 10 can play the same game together.

In order to implement multiplay, it is necessary to execute a game program corresponding to the same game, in all game apparatuses 10 that participate in multiplay. In the game system of the present embodiment, multiplay is possible by transmitting a slave apparatus game program from a game apparatus 10 of a user having a multiplay-enabled game program (hereinafter, referred to as master apparatus) to a game apparatus 10 of a user not having this game program (hereinafter, referred to as slave apparatus). In the following description, multiplay that is performed after a game program (a slave apparatus game program) needed for the multiplay is transmitted from the master apparatus to the slave apparatus as described above, is referred to as "download play" or "DL play".

(Download of Slave Apparatus Program)

Figure 4:
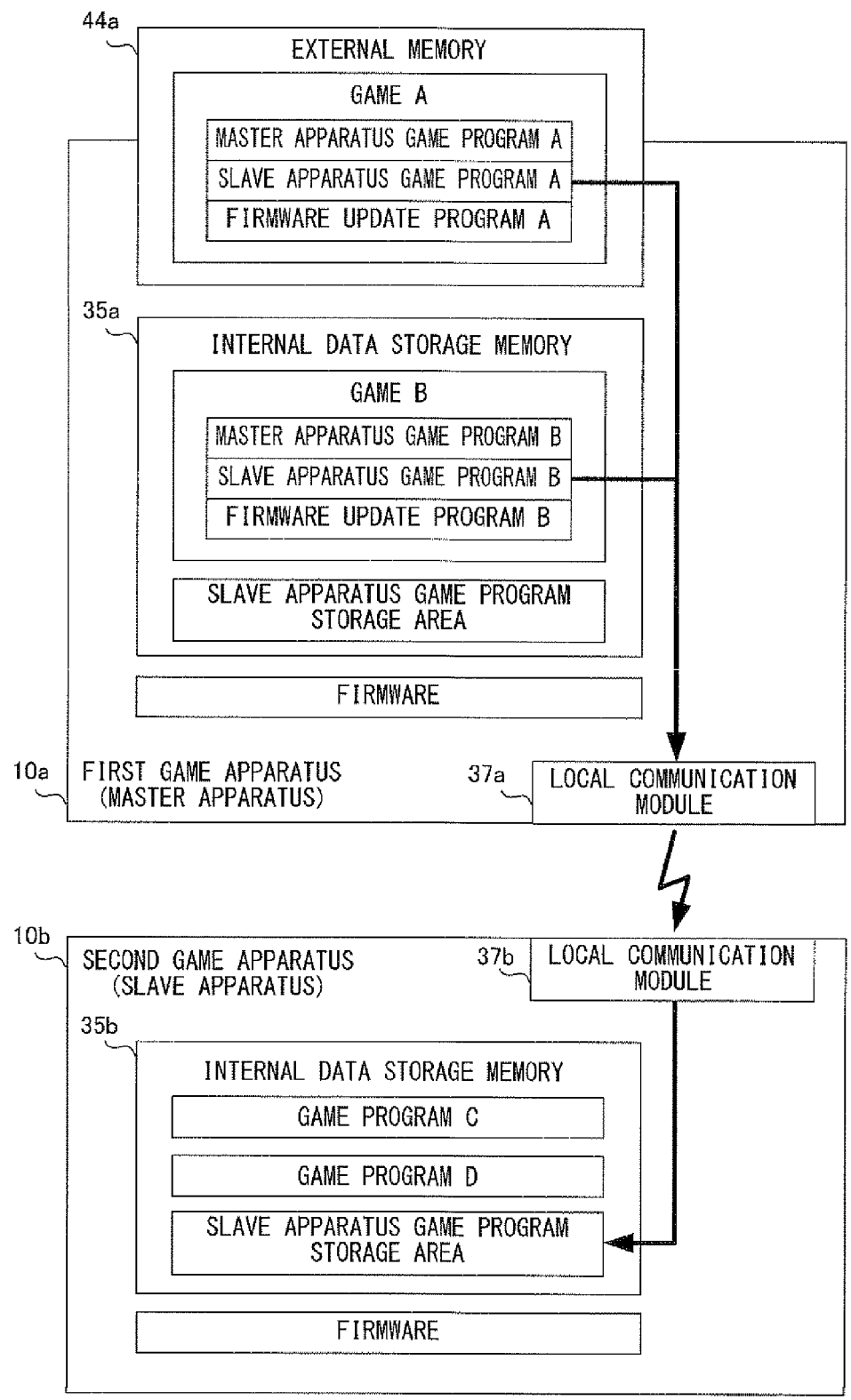
FIG. 4 is a diagram illustrating a state where a slave apparatus program is transmitted from a master apparatus to a slave apparatus.

FIG. 4 illustrates a state where a slave apparatus game program is transmitted from an external memory 44a or an internal data storage memory (hereinafter, also referred to merely as "internal memory") 35a of a first game apparatus (hereinafter, also referred to merely as "master apparatus") 10a to a second game apparatus (hereinafter, also referred to merely as "slave apparatus") 10b.

A download play-enabled game program is stored in the external memory 44a or the internal memory 35a of the master apparatus 10a. For example, a program group related to a download play-enabled game A (specifically, a master apparatus game program A, a slave apparatus game program A, and a firmware update program A) is stored in the external memory 44a. Further, a program group related to a download play-enabled game B (specifically, a master apparatus game program B, a slave apparatus game program B, and a firmware update program B) is stored in the internal memory 35a. Note that the master apparatus game program B, the slave apparatus game program B, and the firmware update program B, which are stored in the internal memory 35a, are typically obtained as a set (a set of programs) from a server apparatus, and stored in the internal memory 35a so as to be associated with each other.

The master apparatus game program A is a computer program executed in the master apparatus 10a when download play of the game A is performed. The slave apparatus game program A is a computer program executed in the slave apparatus 10b when download play of the game A is performed, and can be successfully executed only in a situation where the master apparatus 10a and the slave apparatus 10b are communicable with each other. The firmware update program A is a computer program for updating firmware of the slave apparatus 10b to a version that can execute the slave apparatus game program A. Note that at an appropriate timing (typically, at the time point when the game A is executed in the master apparatus 10a for the first time, or at the time point when the external memory 44a is connected to the master apparatus 10a for the first time), the master apparatus 10a may update its own firmware by using the firmware update program A stored in the external memory 44a. Then, the firmware update program A that has been used for updating the firmware of the master apparatus 10a in this manner may be also used for updating the firmware of the slave apparatus 10b. In other words, update of firmware can be propagated to another apparatus, such that it is performed from the external memory 44a to the master apparatus 10a and further it is performed from the master apparatus 10a to the slave apparatus 10b. Moreover, the firmware update program A stored in the external memory 44a may include two type of programs, that is, a master apparatus firmware update program for updating the firmware of the master apparatus 10a, and a slave apparatus firmware update program for updating the firmware of the slave apparatus 10b. Then, the master apparatus 10a may update its own firmware by using the master apparatus firmware update program among the firmware update program A stored in the external memory 44a, and the slave apparatus 10b may obtain the slave apparatus firmware update program among the firmware update program A stored in the external memory 44a, from the master apparatus 10a, and may update its own firmware by using the slave apparatus firmware update program.

Similarly, the master apparatus game program B is a computer program executed in the master apparatus 10a when download play of the game B is performed. The slave apparatus game program B is a computer program executed in the slave apparatus 10b when download play of the game B is performed, and can be successfully executed only in a situation where the master apparatus 10a and the slave apparatus 10b are communicable with each other. The firmware update program B is a computer program for updating the firmware of the slave apparatus 10b to a version that can execute the slave apparatus game program B. Note that at an appropriate timing (typically, at the time point when the game B is executed in the master apparatus 10a for the first time, or at the time point when master apparatus 10a receives the firmware update program B from the server apparatus), the master apparatus 10a may update its own firmware by using the firmware update program B obtained from the server apparatus. Then, the firmware update program B that has been used for updating the firmware of the master apparatus 10a in this manner may be also used for updating the firmware of the slave apparatus 10b. In other words, update of firmware can be propagated to another apparatus, such that it is performed from the server apparatus to the master apparatus 10a and further it is performed from the master apparatus 10a to the slave apparatus 10b. Moreover, the firmware update program B obtained from the server apparatus may include two types of programs, that is, a master apparatus firmware update program for updating the firmware of the master apparatus 10a, and a slave apparatus firmware update program for updating the firmware of the slave apparatus 10b. Then, the master apparatus 10a may update its own firmware by using the master apparatus firmware update program among the firmware update program B obtained from the server apparatus, and the slave apparatus 10b may obtain the slave apparatus firmware update program among the firmware update program B, from the master apparatus 10a, and may update its own firmware by using the slave apparatus firmware update program.

In the present embodiment, prior to performing download play, a slave apparatus program is transmitted from the master apparatus 10a to the slave apparatus 10b according to need, and the slave apparatus program is stored in an internal memory 35b of the slave apparatus 10b. Then, multiplay is performed by performing mutual communication between the master apparatus 10a operating in accordance with a master apparatus game program and the slave apparatus 10b operating in accordance with a slave apparatus game program.

Conventionally, a slave apparatus game program that is downloaded from a master apparatus into a slave apparatus in download play, is stored in a volatile memory of the slave apparatus, and thus the slave apparatus game program disappears from the slave apparatus when the slave apparatus is powered off. Therefore, conventionally, the slave apparatus game program needs to be downloaded each time download play is started. Meanwhile, in the present embodiment, the slave apparatus program is stored in the internal memory 35b of the slave apparatus 10b in a nonvolatile manner, and thus the slave apparatus program remains stored in the slave apparatus 10b even when the slave apparatus 10b is powered off. Therefore, at a later date, when the slave apparatus 10b attempts to perform download play of the same game, since the slave apparatus program that is required for download play of the game is already present in the internal memory 35b of the slave apparatus 10b, the slave apparatus 10b can start download play with the master apparatus 10a without downloading the slave apparatus program from the master apparatus 10a.

(Update of Firmware)

Figure 5:
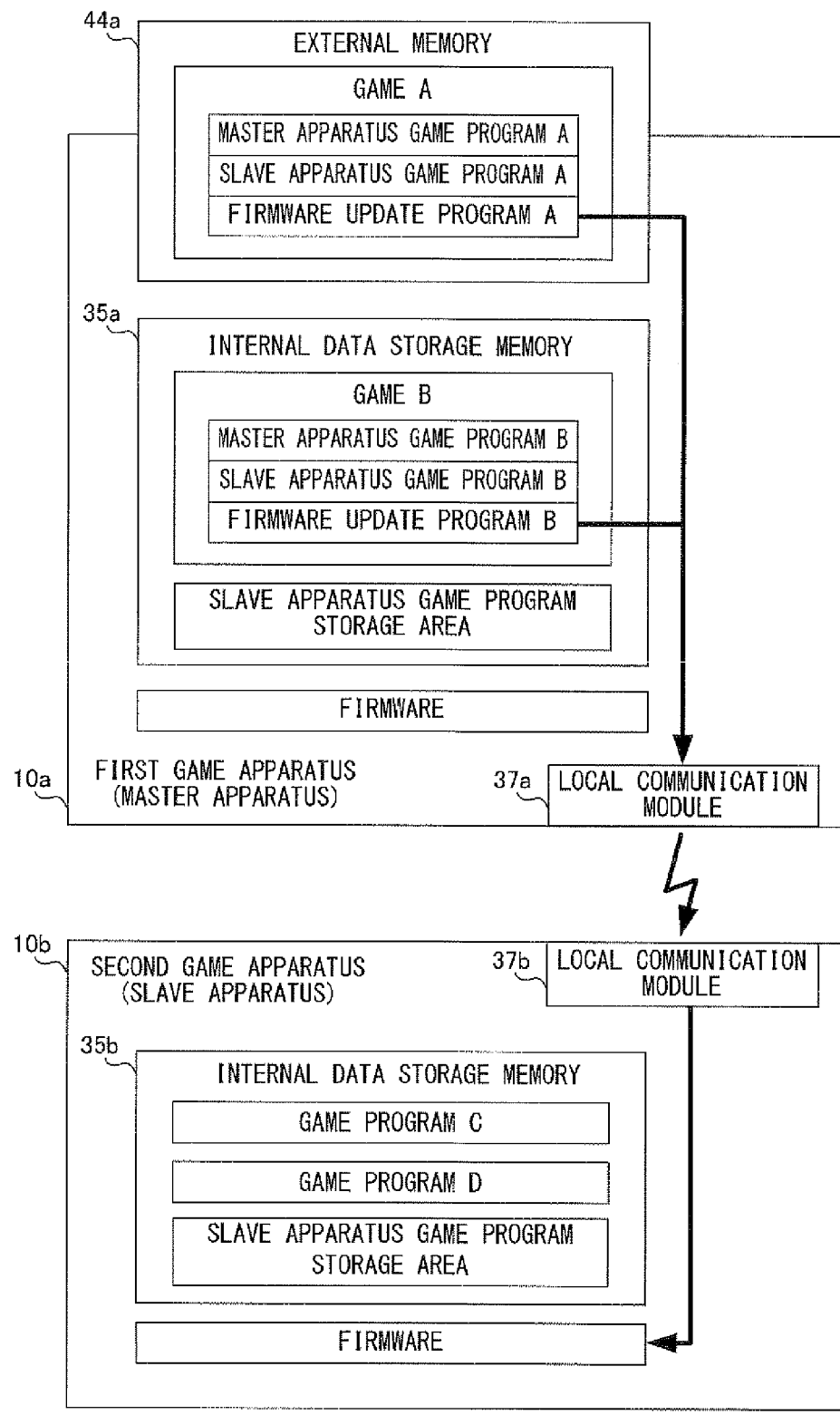
FIG. 5 is diagram illustrating a state where a firmware update program is transmitted from the master apparatus to the slave apparatus.

FIG. 5 illustrates a state where a firmware update program is transmitted from the external memory 44a or the internal memory 35a of the master apparatus 10a to the slave apparatus 10b.

In the present embodiment, prior to performing download play, it is checked whether or not it is necessary to update the firmware of the slave apparatus 10b. Then, when it is necessary to update the firmware of the slave apparatus 10b, a firmware update program is transmitted from the master apparatus 10a to the slave apparatus 10b, and the firmware of the slave apparatus 10b is updated in accordance with the firmware update program.

Conventionally, in general, a firmware update program is downloaded from a server into a game apparatus by connecting to the Internet, or is read from an external storage medium such as a CD-ROM into the game apparatus. However, the present embodiment is characterized in that the firmware update program is received from another game apparatus by communication.

(Flow of Download Play)

Next, a flow of processes of the master apparatus 10a and the slave apparatus 10b until start of download play will be described with reference to FIGS. 6 to 15.

(Flow of Process of Master Apparatus)

FIGS. 6 to 9 illustrate images that are displayed on a screen of the first game apparatus (master apparatus) 10a (e.g., the screen of the lower LCD 12) when download play is started.

Figure 6:
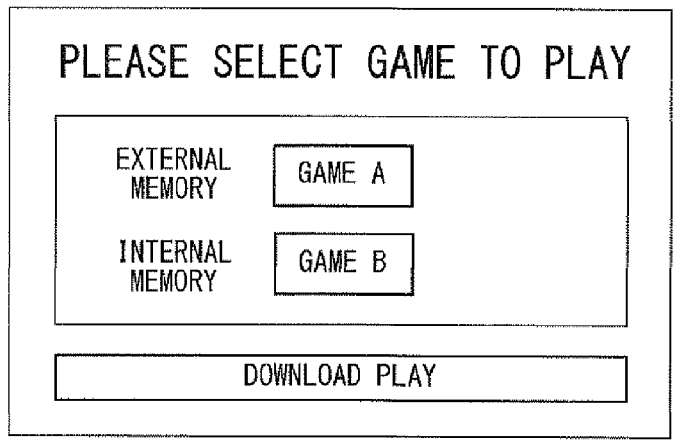
FIG. 6 illustrates an example of an image displayed on a screen of the master apparatus.

When a user (hereinafter, referred to as user A) powers on the first game apparatus 10, a game selection image is displayed as shown in FIG. 6. In the game selection image, the user A can select a desired game from among one or more games (here, the game A) stored in the external memory 44a and one or more games (here, the game B) stored in the internal memory 35a. This selection can be made by using, for example, the touch panel 13. Further, in FIG. 6, the user A can also select "download play". When "download play" is selected, the first game apparatus 10a operates as a slave apparatus, and downloads a slave apparatus program from another game apparatus (master apparatus). In other words, the first game apparatus 10a can be a master apparatus or a slave apparatus depending on a selection of the user A.

Figure 7:
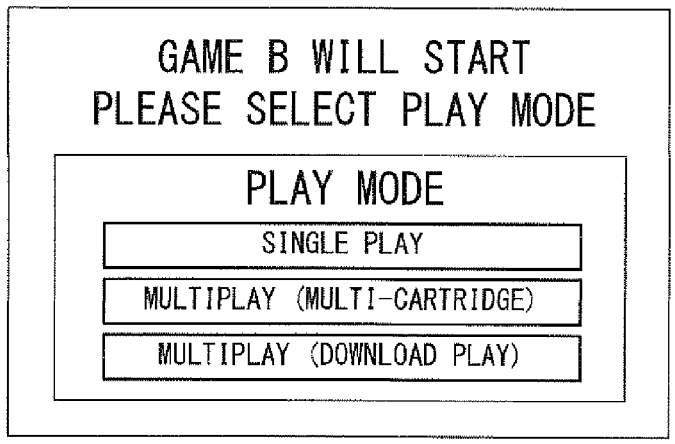
FIG. 7 illustrates an example of the image displayed on the screen of the master apparatus.

When the user A selects "game B" in FIG. 6, a play mode selection image is subsequently displayed as shown in FIG. 7. Here, the user A can select "single play", "multiplay (multi-cartridge)", or "multiplay (download play)". "Single play" is a mode in which one user plays by oneself. "Multiplay (multi-cartridge)" is a mode in which multiplay is performed between a plurality of players each having a game program for the same game. In this mode, it is not necessary to transmit/receive the game program between game apparatuses prior to start of multiplay, but all the game apparatuses that perform multiplay need to have the game program.

Figure 8:
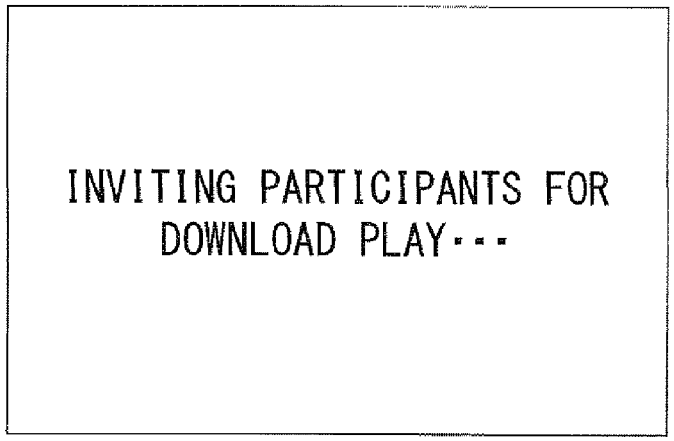
FIG. 8 illustrates an example of the image displayed on the screen of the master apparatus.

When the user A selects "multiplay (download play)" in FIG. 7, the first game apparatus 10a starts operating as a master apparatus, and an invitation image is displayed as shown in FIG. 8. In this state, the first game apparatus 10a transmits a beacon and waits for a participation request from another game apparatus (slave apparatus) (in other words, invites participants for download play).

Figure 9:
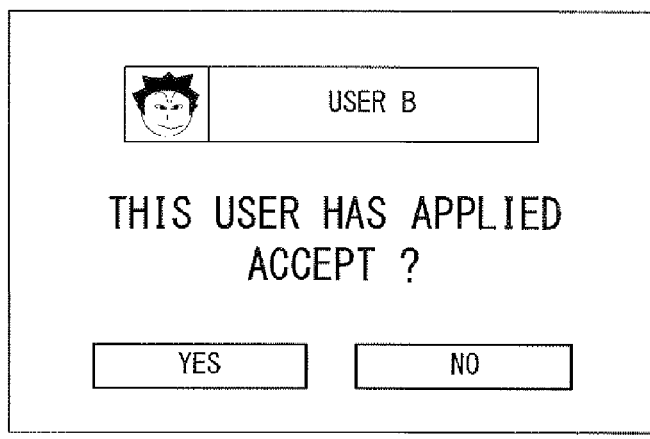
FIG. 9 illustrates an example of the image displayed on the screen of the master apparatus.

When there is an application from the slave apparatus 10b in response to the invitation of the master apparatus 10a, an acceptance image is displayed as shown in FIG. 9. In the acceptance image, information on the slave apparatus 10*b* that has applied for the invitation (a user's face image, the user name, and the like) are displayed.

When the user A selects "Yes" in FIG. 9, the slave apparatus program B and the firmware update program B are downloaded from the master apparatus 10*a* into the slave apparatus 10*b* according to need, and then multiplay is started.

(Flow of Process of Slave Apparatus)

FIGS. 10 to 15 illustrate images that are displayed on a screen of the second game apparatus (slave apparatus) 10*b* (e.g., the screen of the lower LCD 12) when download play is started.

Figure 10:
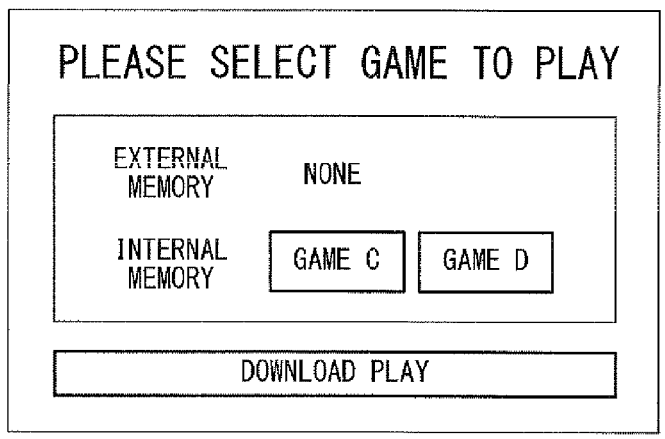
FIG. 10 illustrates an example of an image displayed on a screen of the slave apparatus.

When a user (hereinafter, referred to as user B) powers on the second game apparatus 10*b*, a game selection image is displayed as shown in FIG. 10. In the game selection image, the user B can select a desired game from among one or more games (here, nothing) stored in an external memory 44*b* and one or more games (here, a game C and a game D) stored in the internal memory 35*b*. In addition, in FIG. 10, the user B can also select "download play".

Figure 11:
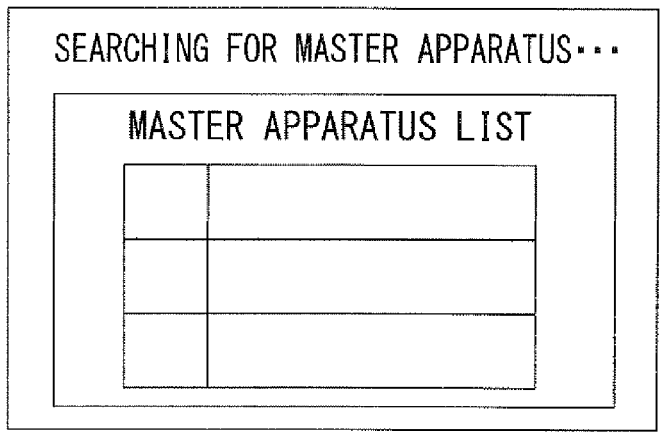
FIG. 11 illustrates an example of the image displayed on the screen of the slave apparatus.

When the user B selects "download play" in FIG. 10, the second game apparatus 10*b* starts operating as a slave apparatus, and a search image is displayed as shown in FIG. 11. In this state, the second game apparatus 10*b* attempts to receive a beacon transmitted from a master apparatus that invites participants for download play.

Figure 12:
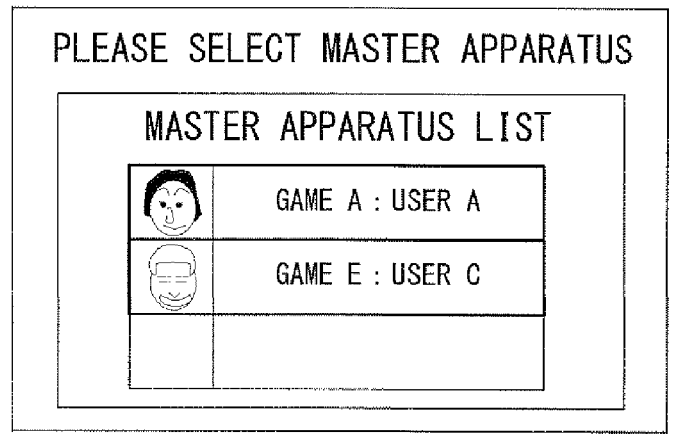
FIG. 12 illustrates an example of the image displayed on the screen of the slave apparatus.

When beacons transmitted from two or more master apparatuses are received, information on these master apparatuses (users' face images, game titles, the user names, and the like) is further displayed on the basis of information (master apparatus information) broadcasted from the master apparatuses, as shown in FIG. 12. In the example of FIG. 12, information on the master apparatus of the user A that invites participants for download play of the game A, and information on a master apparatus of a user C that invites participants for download play of a game E, are listed. The user B can select a desired master apparatus from among the listed master apparatuses, and can apply for download play with the selected master apparatus.

When the user B selects the master apparatus 10*a* of the user A in FIG. 12, version information of the firmware of the slave apparatus 10*b* is automatically transmitted from the slave apparatus 10*b* to the master apparatus 10*a*, and, in the master apparatus 10*a*, it is automatically determined whether or not it is necessary to update the firmware of the slave apparatus 10*b*.

Figure 13:
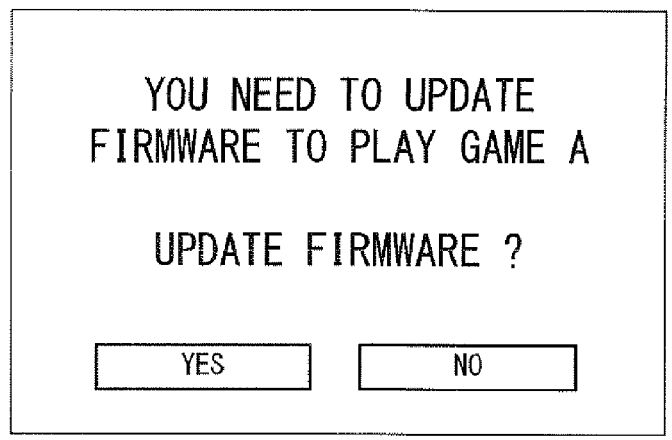
FIG. 13 illustrates an example of the image displayed on the screen of the slave apparatus.

When it is determined that it is necessary to update the firmware of the slave apparatus 10*b*, a signal indicating this determination result is transmitted from the master apparatus 10*a* to the slave apparatus 10*b*, and an update confirmation image is displayed on the screen of the slave apparatus 10*b* as shown in FIG. 13.

When the user B selects "Yes" in FIG. 13, the firmware update program A corresponding to the game A is transmitted from the master apparatus 10*a* to the slave apparatus 10*b*, and the firmware of the slave apparatus 10*b* is updated on the basis of the firmware update program A.

Figure 14:
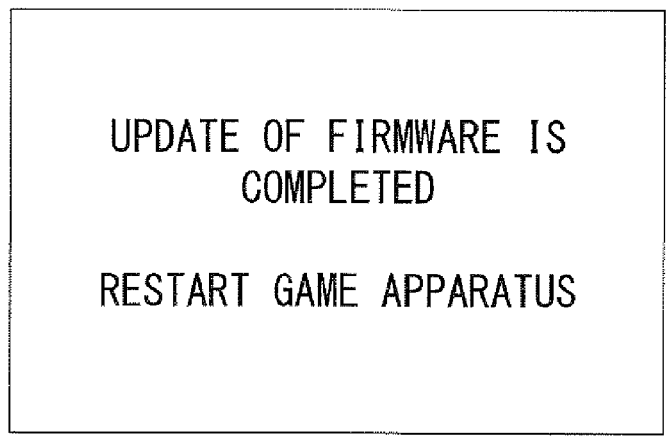
FIG. 14 illustrates an example of the image displayed on the screen of the slave apparatus.
Figure 15:
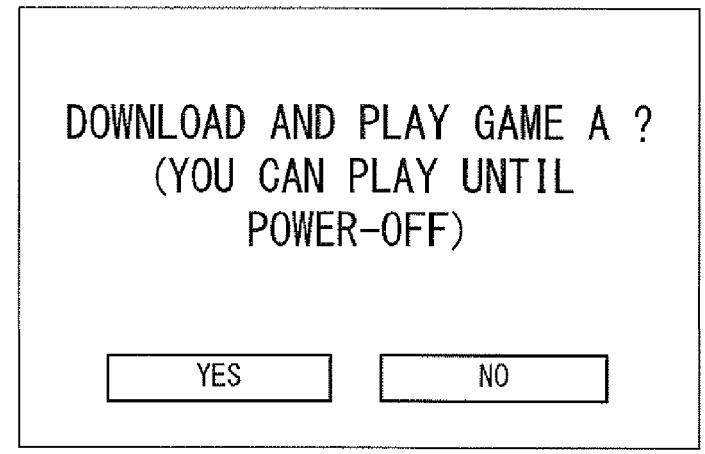
FIG. 15 illustrates an example of the image displayed on the screen of the slave apparatus.

When the update of the firmware of the slave apparatus 10*b* is completed, an update completion image is displayed on the screen of the slave apparatus 10*b* as shown in FIG. 14, and the slave apparatus 10*b* is restarted. After the restart, a download play confirmation image is displayed as shown in FIG. 15. When the user B selects "Yes" here, the slave apparatus game program A is downloaded from the master apparatus 10*a* into the slave apparatus 10*b* and stored in the internal memory 35*b* of the slave apparatus 10*b*. Then, multiplay of the game A is started in accordance with the slave apparatus game program A.

(Details of Operations of Game Apparatus)

Next, operations of the game apparatus 10 will be described in more detail with reference to FIGS. 16 to 22.

Figure 16:
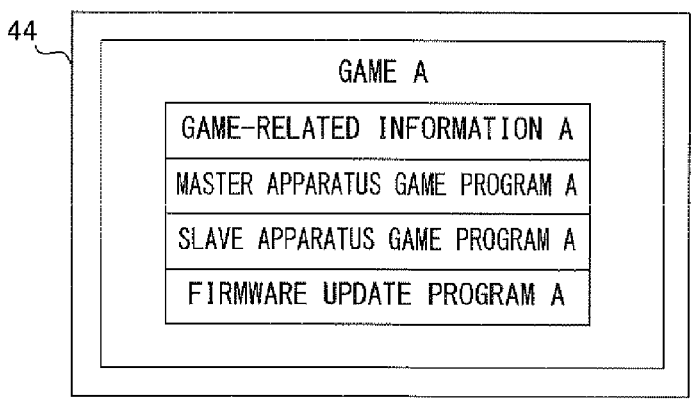
FIG. 16 illustrates an example of programs and data in an external memory 44.

FIG. 16 illustrates an example of programs and data stored in the external memory 44. In this example, programs and data that are related to the game A are stored in the external memory 44. Specifically, game-related information A, the master apparatus game program A, the slave apparatus game program A, and the firmware update program A are stored. The game-related information A includes, for example, a game ID for identifying the game A, the title of the game A, an icon indicating the game A, and version information of firmware required for executing the game A.

Figure 17:
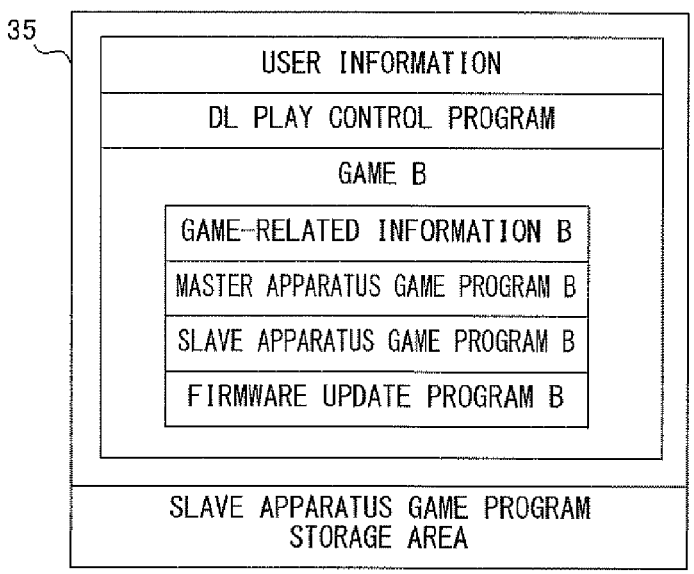
FIG. 17 illustrates an example of programs and data in an internal data storage memory 35.

FIG. 17 illustrates an example of programs and data stored in the internal memory 35. In this example, user information, a DL play control program, and programs and data that are related to the game B, are stored in the internal memory 35. The user information includes, for example, the user name and a user's face image. The DL play control program is a computer program for performing processes required for starting download play. The programs and the data that are related to the game B are, for example, downloaded from a server apparatus through the wireless communication module 36 and the Internet and stored in the internal memory 35. The internal memory 35 is provided with a slave apparatus game program storage area for storing a slave apparatus game program.

Note that the DL play control program may be previously stored in the internal memory 35 before shipment of the game apparatus 10, or may be downloaded by the user from a server apparatus or supplied to the game apparatus 10 from an external storage medium such as a CD-ROM or a semiconductor memory, after the shipment of the game apparatus 10.

FIGS. 18 to 22 are flowcharts illustrating a flow of a process performed by the CPU 311 of the game apparatus 10 on the basis of the DL play control program and the like.

(Main Process)

Figure 18:
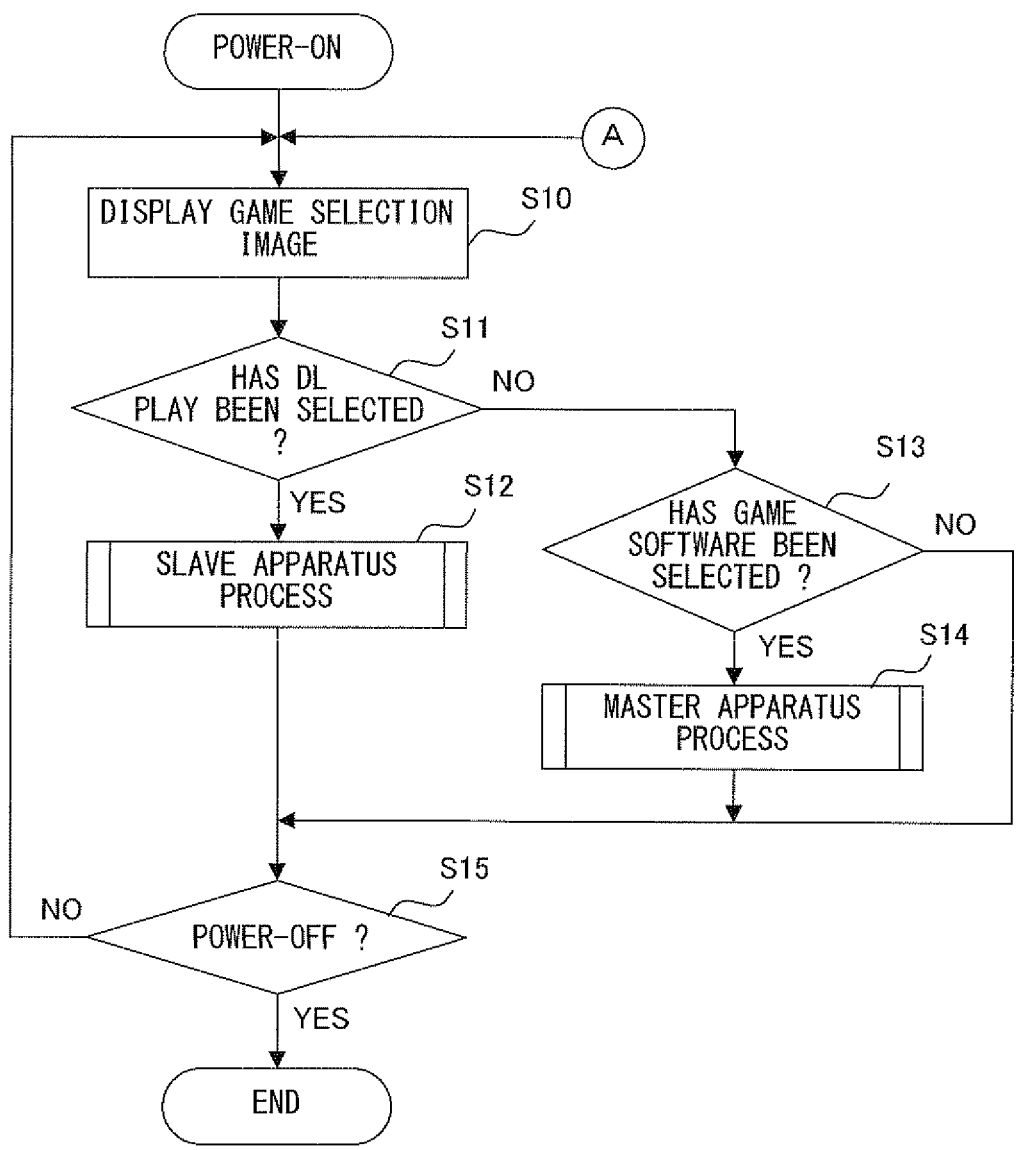
FIG. 18 is a flowchart illustrating a flow of a process of a game apparatus.

In FIG. 18, when the game apparatus 10 is powered on, execution of the DL play control program is started, and the CPU 311 displays a game selection image (FIGS. 6 and 10) on the screen at step S10. In the game selection image, games stored in the external memory 44 and games stored in the internal memory 35 are displayed. Note that a game (slave apparatus game program) stored in the slave apparatus game program storage area of the internal memory 35 is not displayed. Thus, the slave apparatus game program stored in the slave apparatus game program storage area of the internal memory 35 is not executed unless the user selects download play in the game selection image. In other words, the game (slave apparatus game program) stored in the slave apparatus game program storage area of the internal memory 35 cannot be voluntarily executed by an operation of the user, and is executable only in a state of being communicable with a master apparatus that can provide the slave apparatus game program.

At step S11, the CPU 311 determines whether or not download play ("download play" in FIG. 6 or 10) has been selected by the user, on the basis of a signal from an input device (e.g., the touch panel 13). When download play has been selected by the user, the processing proceeds to step S12, and when not, the processing proceeds to step S13.

At step S12, the CPU 311 performs a slave apparatus process. The slave apparatus process will be described in detail later.

At step S13, the CPU 311 determines whether or not any piece of game software displayed in the game selection image has been selected by the user, on the basis of a signal from the input device. When any piece of the game software has been selected, the processing proceeds to step S14, and when not, the processing proceeds to step S15.

At step S14, the CPU 311 performs a master apparatus process. The master apparatus process will be described in detail later.

At step S15, the CPU 311 determines whether or not the game apparatus 10 has been powered off. When the game apparatus 10 has been powered off, the CPU 311 ends the execution of the DL play control program, and when not, the processing returns to step S10.

(Slave Apparatus Process)

Next, the slave apparatus process at step S12 in FIG. 18 will be described in detail with reference to the flowchart in FIG. 19.

Figure 19:
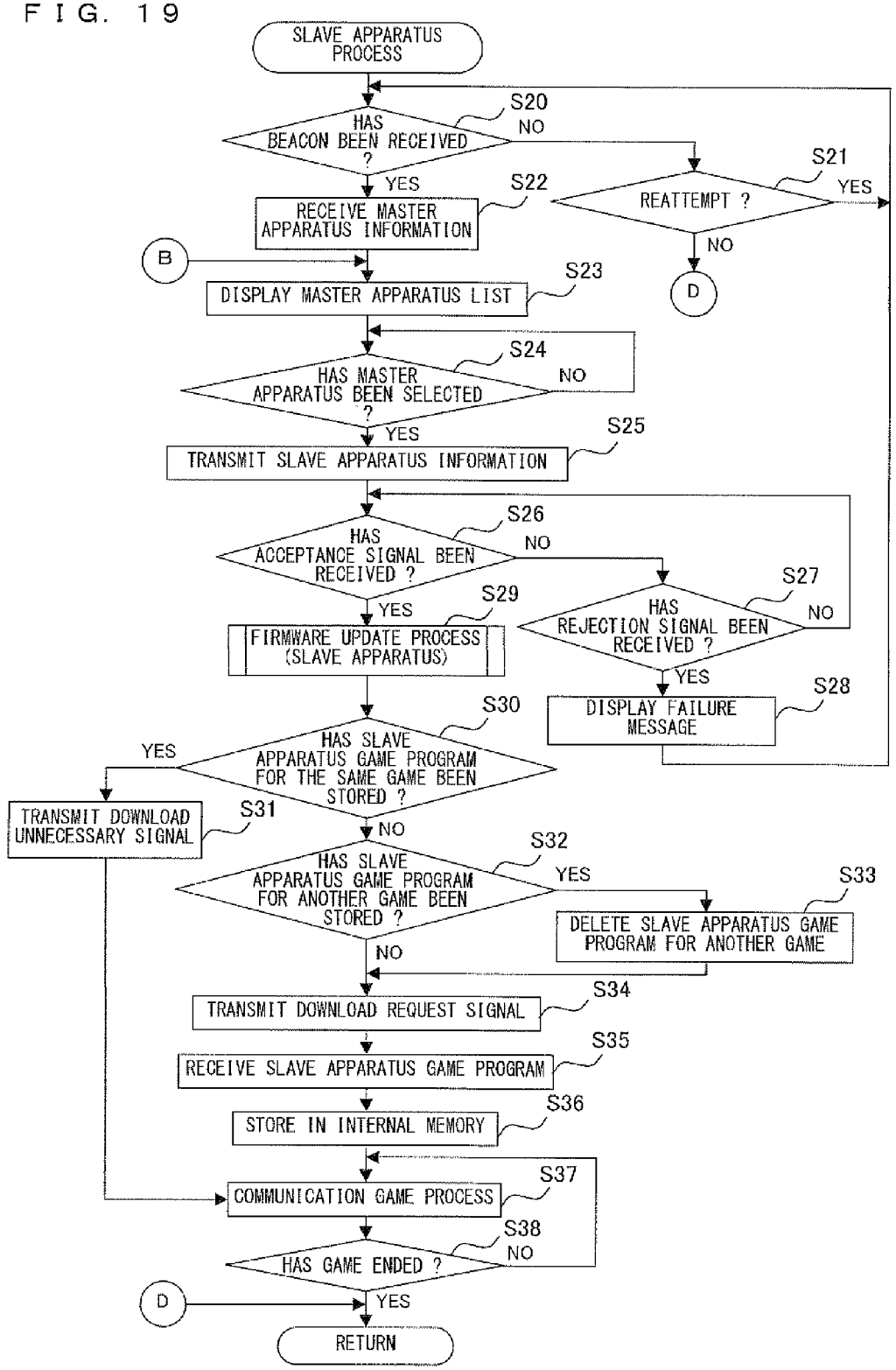
FIG. 19 is a flowchart illustrating in detail a slave apparatus process.

At step S20 in FIG. 19, in order to search for a master apparatus that is present in a range in which short-range wireless communication is enabled (in other words, in order to participate in a master apparatus that invites participants for download play), the CPU 311 determines whether or not a beacon transmitted from another game apparatus has been received. When a beacon has been received, the processing proceeds to step S22, and when not, the processing proceeds to step S21.

At step S21, the CPU 311 inquires of the user about whether or not to reattempt to receive a beacon. When reattempting to receive a beacon, the processing returns to step S20, and when not, the CPU 311 ends the slave apparatus process.

At step S22, the CPU 311 receives master apparatus information broadcasted from the master apparatus that is the transmission source of the received beacon. This reception is performed, for example, by using a communication mode in which it is possible to receive a packet without connecting to a network. The master apparatus information includes information on the master apparatus (an user's face image, the game ID and the title of a game of which participants for download play are invited, an icon, version information of firmware required for executing the game, and the like).

At step S23, the CPU 311 displays a master apparatus list (FIG. 12) on the screen on the basis of the received master apparatus information.

At step S24, the CPU 311 determines whether or not any one of master apparatuses displayed in the master apparatus list has been selected by the user, on the basis of a signal from the input device (e.g., the touch panel 13). When any one of the master apparatuses has been selected, the processing proceeds to step S25, and when not, the CPU 311 waits until any one of the master apparatuses is selected.

At step S25, the CPU 311 transmits slave apparatus information to the selected master apparatus (hereinafter, referred to merely as master apparatus). The slave apparatus information includes, for example, user information (an user's face image, the user name, and the like) stored in the internal memory 35.

At step S26, the CPU 311 determines whether or not an acceptance signal has been received from the master apparatus. When the acceptance signal has been received, the processing proceeds to step S29, and when not, the processing proceeds to step S27.

At step S27, the CPU 311 determines whether or not a rejection signal has been received from the master apparatus. When the rejection signal has been received, the processing proceeds to step S28, and when not, the processing returns to step S26.

At step S28, the CPU 311 displays, on the screen, a message indicating that start of download play with the master apparatus fails, and then the processing returns to step S20.

At step S29, the CPU 311 performs a firmware update process (slave apparatus). The firmware update process (slave apparatus) will be described in detail later.

At step S30, the CPU 311 determines whether or not a slave apparatus game program for a game of which download play is to be performed has been already stored in the slave apparatus game program storage area of the internal memory 35. This determination is performed, for example, by comparing the game ID included in the master apparatus information received at step S22 in FIG. 19 to the game ID of a slave apparatus game program that is present in the slave apparatus game program storage area of the internal memory 35 (if being present). When the slave apparatus game program for the game of which download play is to be performed has been already stored in the slave apparatus game program storage area of the internal memory 35, the processing proceeds to step S31, and when not, the processing proceeds to step S32.

At step S31, the CPU 311 transmits a download unnecessary signal to the master apparatus.

At step S32, the CPU 311 determines whether or not a slave apparatus game program for another game that is different from the game of which download play is to be performed has been stored in the slave apparatus game program storage area of the internal memory 35. When the slave apparatus game program for the other game has been stored, the processing proceeds to step S33, and when not, the processing proceeds to step S34.

At step S33, the CPU 311 deletes the slave apparatus game program for the other game, which has been stored in the slave apparatus game program storage area of the internal memory 35. This is because the slave apparatus game program storage area is configured to store only one game program, and thus, in order to download and newly store a game program, it is necessary to delete an already-stored game program.

At step S34, the CPU 311 transmits a download request signal to the master apparatus.

At step S35, the CPU 311 receives the slave apparatus game program for the game of which download play is to be performed, from the master apparatus by short-range wireless communication through the local wireless communication module 37. Note that the received slave apparatus game program includes the game ID of the game corresponding to the slave apparatus game program (or the game ID is received together with the slave apparatus game program).

At step S36, the CPU 311 stores the received slave apparatus game program in the slave apparatus game program storage area of the internal memory 35.

At step S37, the CPU 311 performs a communicative game process (namely, multiplay) on the basis of the slave apparatus game program that is stored in the slave apparatus game program storage area of the internal memory 35. In the communicative game process, game data is transmitted and received as appropriate between a plurality of game apparatuses, and a plurality of users operating these game apparatuses, respectively, can play the same game together.

At step S38, the CPU 311 determines whether or not the game has ended. When the game has ended, the CPU 311 ends the slave apparatus process, and when not, the processing returns to step S37.

(Firmware Update Process (Slave Apparatus))

Next, the firmware update process (slave apparatus) at step S29 in FIG. 19 will be described in detail with reference to the flowchart in FIG. 20.

Figure 20:
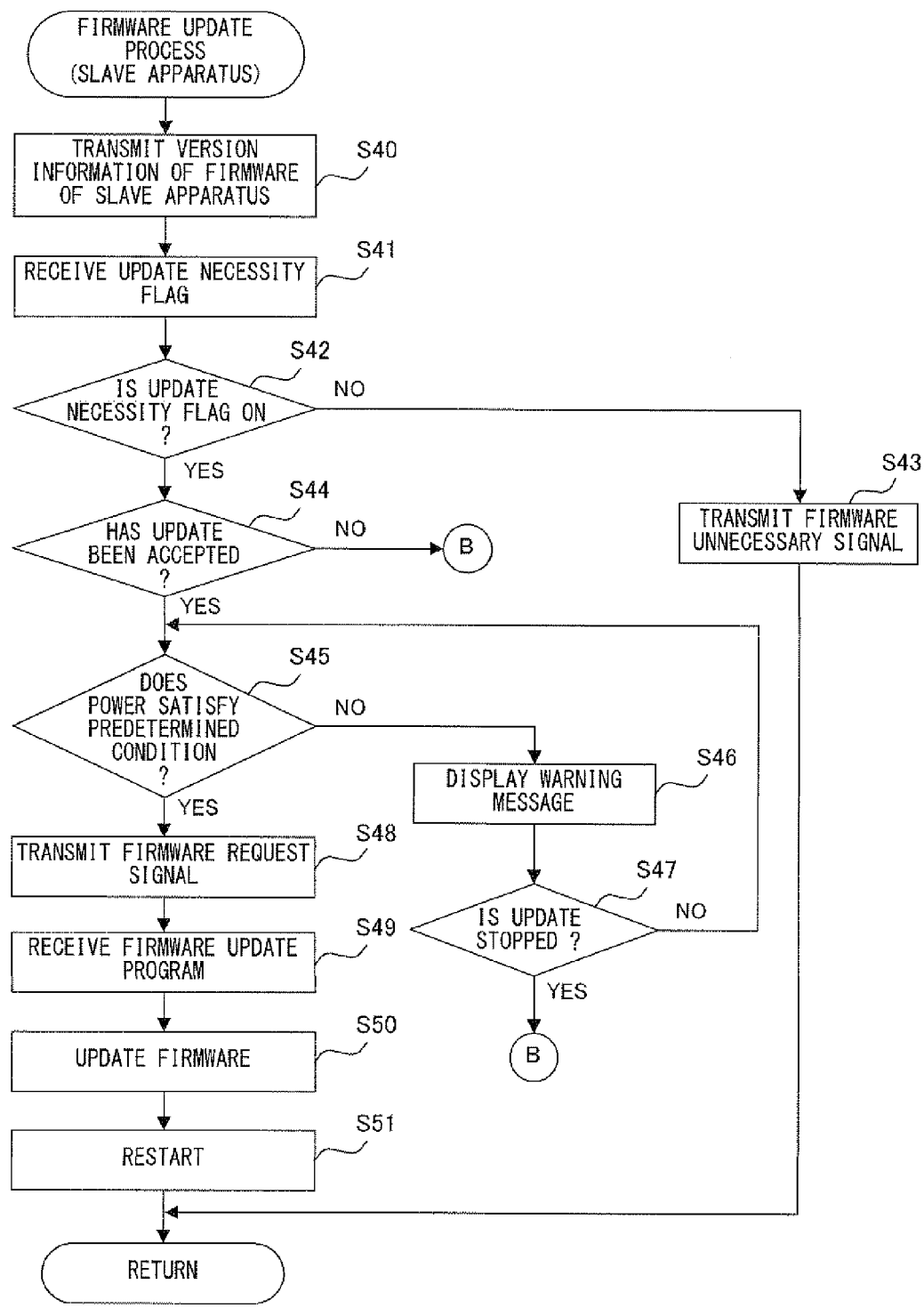
FIG. 20 is a flowchart illustrating in detail a firmware update process (slave apparatus)

At step S40 in FIG. 20, the CPU 311 transmits version information of the firmware of the slave apparatus (namely, of the own game apparatus) to the master apparatus. The version information may be, for example, an identification code for identifying the version of the firmware.

At step S41, the CPU 311 receives an update necessity flag from the master apparatus. The update necessity flag is information indicating whether or not it is necessary to update the firmware of the slave apparatus in order to execute the slave apparatus game program for the game of which download play is to be performed. When it is necessary to update the firmware of the slave apparatus, the update necessity flag is ON. When it is not necessary to update the firmware of the slave apparatus, the update necessity flag is OFF.

At step S42, the CPU 311 determines whether or not the received update necessity flag is ON. When the received update necessity flag is ON, the processing proceeds to step S44, and when not, the processing proceeds to step S43.

At step S43, the CPU 311 transmits a firmware unnecessary signal to the master apparatus.

At step S44, the CPU 311 determines whether or not update of the firmware has been accepted by the user (FIG. 13). When the update of the firmware has been accepted, the processing proceeds to step S45, and when not, the processing returns to step S23 in FIG. 19.

At step S45, the CPU 311 determines whether or not the power to the game apparatus 10 satisfies a predetermined condition. This is a check for preventing the power to the game apparatus 10 from being cut off during an update process of the firmware. The predetermined condition includes, for example, the remaining level of a battery provided in the game apparatus 10, and whether or not commercial power is supplied to the game apparatus 10 through an AC adapter. When the remaining level of the battery provided in the game apparatus 10 is equal to or higher than a predetermined value and/or when the commercial power is supplied to the game apparatus 10 through the AC adapter, it is determined that the predetermined condition is satisfied. When the power to the game apparatus 10 satisfies the predetermined condition, the processing proceeds to step S48, and when not, the processing proceeds to step S46.

At step S46, the CPU 311 displays, on the screen, a warning message indicating that there is the possibility that the power to the game apparatus 10 will be cut off during the update process of the firmware, a message for prompting recharging of the battery and/or connection of the AC adapter, or a message for inquiring of the user about whether to stop or continue the update of the firmware.

At step S47, the CPU 311 determines whether or not stop of the update of the firmware has been instructed by the user. When the stop of the update of the firmware has been instructed, the processing returns to step S23 in FIG. 19, and when not, the processing returns to step S45.

At step S48, the CPU 311 transmits a firmware request signal to the master apparatus.

At step S49, the CPU 311 receives a firmware update program corresponding to the game of which download play is to be performed, from the master apparatus by short-range wireless communication through the local wireless communication module 37.

At step S50, the CPU 311 updates the firmware on the basis of the received firmware update program.

At step S51, the CPU 311 restarts the game apparatus 10 in order to activate the updated firmware. Then, the firmware update process (slave apparatus) ends.

(Master Apparatus Process)

Next, the master apparatus process at step S14 in FIG. 18 will be described in detail with reference to the flowchart in FIG. 21.

Figure 21:
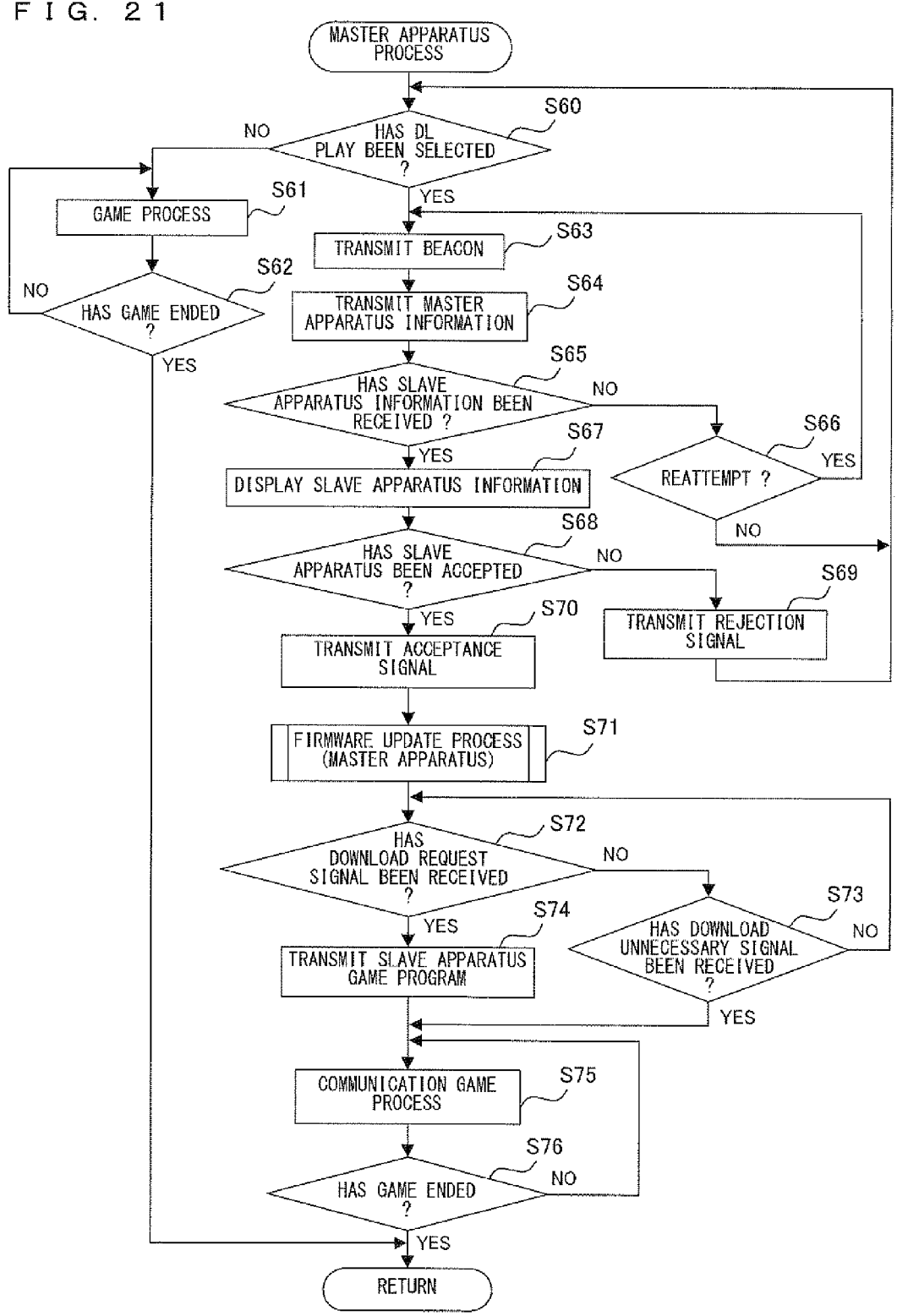
FIG. 21 is a flowchart illustrating in detail a master apparatus process.

At step S60 in FIG. 21, the CPU 311 determines whether or not download play ("multiplay (download play)" in FIG. 7) has been selected by the user, on the basis of a signal from the input device (e.g., the touch panel 13). When download play has been selected by the user, the processing proceeds to step S63, and when not, the processing proceeds to step S61.

At step S61, the CPU 311 performs a game process corresponding to the game mode selected by the user ("single play" or "multiplay (multi-cartridge)" in FIG. 7).

At step S62, the CPU 311 determines whether or not the game has ended. When the game has ended, the CPU 311 ends the master apparatus process, and when not, the processing returns to step S61.

At step S63, the CPU 311 transmits a beacon in order to notify the presence of the own apparatus to another game apparatus that is present in a range in which short-range wireless communication is enabled (in other words, in order to invite participation of another game apparatus in download play).

At step S64, the CPU 311 broadcasts master apparatus information (e.g., a user's face image, the user name, the game ID and the title of the game of which participants for download play are invited).

At step S65, the CPU 311 determines whether or not slave apparatus information has been received from the slave apparatus. When the slave apparatus information has been received, the processing proceeds to step S67, and when not, the processing proceeds to step S66.

At step S66, the CPU 311 inquires of the user about whether or not to reattempt to invite participants for download play (in other words, to transmit a beacon). When reattempting to invite participants for download play, the processing returns to step S63, and when not, the processing returns to step S60.

At step S67, the CPU 311 displays the received slave apparatus information (the slave apparatus information from the slave apparatus that has applied for the invitation) on the screen (FIG. 9).

At step S68, the CPU 311 determines whether or not participation of the slave apparatus that has applied for the invitation (hereinafter, referred to merely as slave apparatus) has been accepted by the user. When the participation has been accepted, the processing proceeds to step S70, and when not, the processing proceeds to step S69.

At step S69, the CPU 311 transmits a rejection signal to the slave apparatus. Then, the processing returns to step S60.

At step S70, the CPU 311 transmits an acceptance signal to the slave apparatus.

At step S71, the CPU 311 performs a firmware update process (master apparatus). The firmware update process (master apparatus) will be described in detail later.

At step S72, the CPU 311 determines whether or not a download request signal has been received from the slave apparatus. When the download request signal has been received, the processing proceeds to step S74, and when not, the processing proceeds to step S73.

At step S73, the CPU 311 determines whether or not a download unnecessary signal has been received from the slave apparatus. When the download unnecessary signal has been received, the processing proceeds to step S75, and when not, the processing returns to step S72.

At step S74, the CPU 311 reads out the slave apparatus game program for the game of which download play is to be performed (namely, the game selected by the user in the game selection image), from the external memory 44 or the internal memory 35, and transmits the slave apparatus game program to the slave apparatus by short-range wireless communication through the local wireless communication module 37.

At step S75, the CPU 311 performs the communicative game process (namely, multiplay) on the basis of the master apparatus game program corresponding to the transmitted slave apparatus game program that is stored in the external memory 44 or the internal memory 35.

At step S76, the CPU 311 determines whether or not the game has ended. When the game has ended, the CPU 311 ends the master apparatus process, and when not, the processing returns to step S75.

(Firmware Update Process (Master Apparatus)

Next, the firmware update process (master apparatus) at step S71 in FIG. 21 will be described in detail with reference to the flowchart in FIG. 22.

Figure 22:
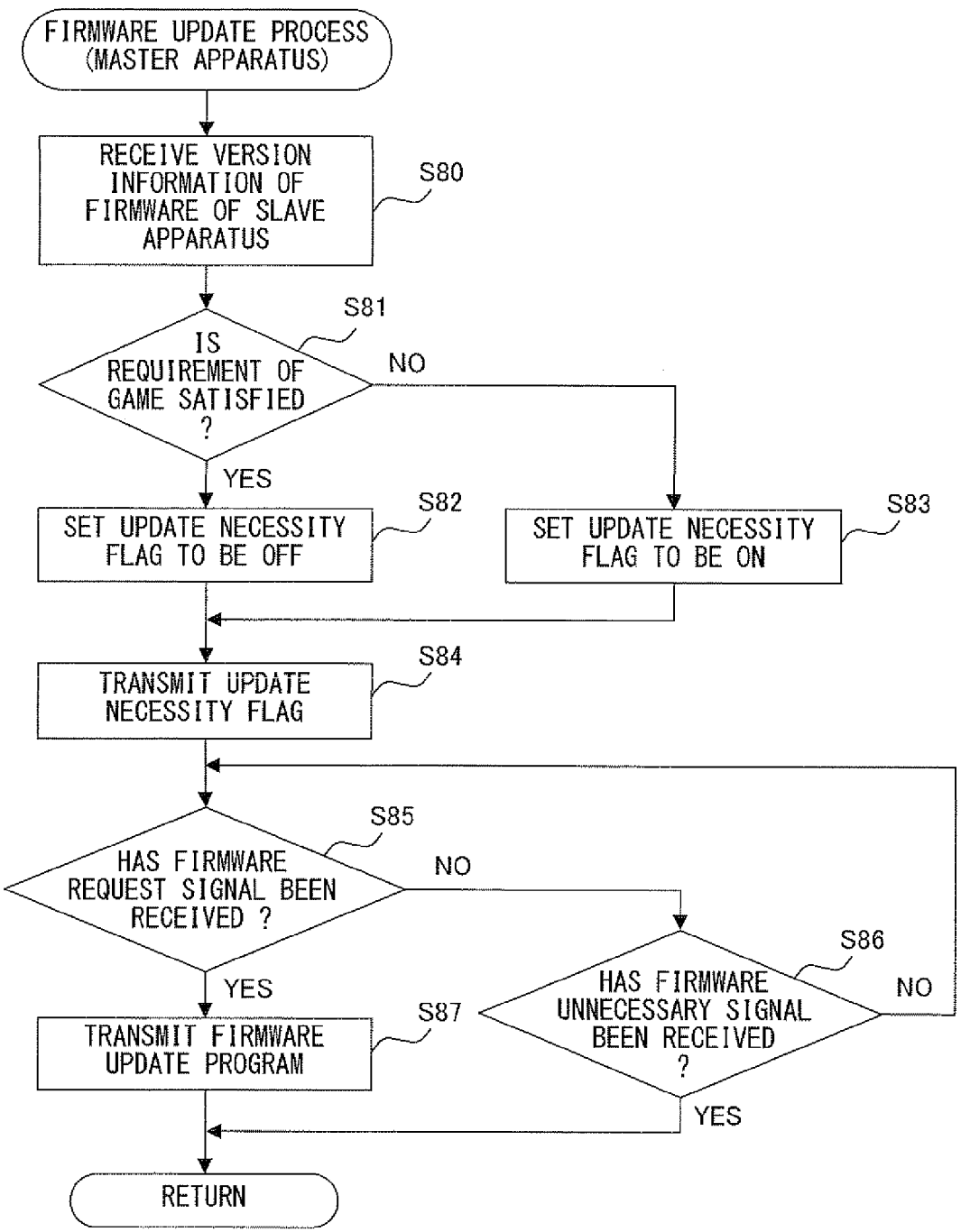
FIG. 22 is a flowchart illustrating in detail a firmware update process (master apparatus).

At step S80 in FIG. 22, the CPU 311 receives the version information of the firmware of the slave apparatus from the slave apparatus.

At step S81, the CPU 311 determines whether or not the current firmware of the slave apparatus satisfies a requirement of the game of which download play is to be performed (namely, the game selected by the user in the game selection image). Specifically, this determination is performed on the basis of the received version information of the firmware of the slave apparatus and the game-related information of the game. When the current firmware of the slave apparatus satisfies the requirement of the game, the processing proceeds to step S82, and when not, the processing proceeds to step S83.

At step S82, the CPU 311 sets the update necessity flag to be OFF.

At step S83, the CPU 311 sets the update necessity flag to be ON.

At step S84, the CPU 311 transmits the update necessity flag to the slave apparatus.

At step S85, the CPU 311 determines whether or not a firmware request signal has been received from the slave apparatus. When the firmware request signal has been received, the processing proceeds to step S87, and when not, the processing proceeds to step S86.

At step S86, the CPU 311 determines whether or not a firmware unnecessary signal has been received from the slave apparatus. When the firmware unnecessary signal has been received, the CPU 311 ends the firmware update process (master apparatus), and when not, the processing returns to step S85.

At step S87, the CPU 311 reads out the firmware update program corresponding to the game of which download play is to be performed, from the external memory 44 or the internal memory 35, and transmits the firmware update program to the slave apparatus by short-range wireless communication through the local wireless communication module 37. Then, the CPU 311 ends the firmware update process (master apparatus).

Advantageous Effects of the Above Embodiment

According to the above embodiment, a user having a game program can enjoy multiplay with another user who does not have the game program. In addition, even when the version of the firmware of the game apparatus 10 of the other user who does not have the game program is old, the firmware can be updated and the other user can enjoy multiplay.

Further, according to the above embodiment, the slave apparatus game program that is downloaded from the master apparatus to the slave apparatus in download play is stored in the nonvolatile memory of the slave apparatus. Thus, when download play of the same game is performed again after the slave apparatus is powered off, it is not necessary to download the slave apparatus program from the master apparatus again, and the waiting time until download play is started can be shortened. In addition, time and effort for an operation of the user can be omitted.

Further, according to the above embodiment, before start of download play, it is checked whether or not it is necessary to update the firmware of the slave apparatus. When it is necessary to update the firmware, the firmware update program is transmitted from the master apparatus to the slave apparatus, and the firmware of the slave apparatus is updated. Thus, the firmware is automatically updated according to need before the start of download play, without time and effort such as for connecting to the Internet and downloading the firmware update program from a server into the game apparatus. This automatic update is convenient for the user. In addition, even in a situation where Internet connection is impossible, it is possible to update the firmware.

Further, according to the above embodiment, the slave apparatus game program that is downloaded by the slave apparatus from the master apparatus is stored in the internal memory 35, but not displayed in the game selection image (FIGS. 6 and 10). Thus, the user cannot execute the slave apparatus game program unless it is in a state where it is possible to communicate with another game apparatus having the master apparatus game program corresponding to the slave apparatus game program. Therefore, similarly to conventional download play, execution of the slave apparatus game program can be limited to a period until the game apparatus 10 is powered off, in the state where it is possible to communicate with the other game apparatus having the master apparatus game program.

Further, according to the above embodiment, the slave apparatus game program storage area is secured in the internal memory 35. Thus, occurrence of a situation can be prevented in which, when starting download play, the slave apparatus game program cannot be downloaded due to insufficiency of a free space.

(Modifications)

In the above embodiment, the slave apparatus downloads the slave apparatus game program from the master apparatus, and performs multiplay with the master apparatus. However, the present invention is not limited thereto. In another embodiment, the slave apparatus may download an application program other than games (e.g., chatting software, and musical instrument playing software) from the master apparatus, and may perform predetermined information processing including a communication process with the master apparatus. In still another embodiment, an application program that does not include a communication process with the master apparatus (e.g., a game program for single play, and moving image viewing software) may be downloaded from the master apparatus into the slave apparatus.

Further, in the above embodiment, the master apparatus game program is different from the slave apparatus game program. In another embodiment, the master apparatus game program and the slave apparatus game program may be the same.

Further, in the above embodiment, the slave apparatus game program that is downloaded by the slave apparatus from the master apparatus is stored in the slave apparatus game program storage area of the internal memory 35 of the slave apparatus. However, the present invention is not limited thereto. The slave apparatus game program may be stored in an optional area of the internal memory 35 or in a nonvolatile memory other than the internal memory 35. In this case, in order that a game program downloaded from the master apparatus in download play is identifiable from other game programs, a flag (download play flag) indicating whether or not the game program is a game program downloaded from the master apparatus in download play may be stored so as to be associated with each game program stored in the internal memory 35 or the like. When the game selection image (FIGS. 6 and 10) is displayed, only game programs other than the game program downloaded from the master apparatus in download play may be displayed by referring to the download play flag.

Further, in the above embodiment, the slave apparatus game program storage area is configured to store only one slave apparatus game program. In another embodiment, a plurality of slave apparatus game programs may be stored in the slave apparatus game program storage area. In this case, when the number or the total data size of the slave apparatus game programs that are stored in the slave apparatus game program storage area exceeds a predetermined value, or when there is no free space for storing a downloaded slave apparatus program, at least one slave apparatus game program may be deleted on the basis of a predetermined criterion (e.g., a game program that was stored in the internal memory at the oldest date, a game program for which the game was released at the oldest date, and a game program with which download play was performed at the oldest date), or a slave apparatus game program that should be deleted may be selected by the user.

Further, in the above embodiment, transmission of the program from the master apparatus to the slave apparatus is performed by using short-range wireless communication through the local wireless communication module 37. However, the present invention is not limited thereto. In another embodiment, any other communication methods such as communication through the wireless communication module 36, communication through a communication cable, infrared communication, and communication through the Internet may be used.

Further, in the above embodiment, the hand-held game apparatus 10 is used. However, the present invention is not limited thereto, any information processing apparatuses (e.g., portable information processing apparatuses such as mobile phones and notebook computers, and stationary information processing apparatuses such as stationary game apparatuses and desktop personal computers) may be used. In addition, the master apparatus and the slave apparatus may be different types of information processing apparatuses.

Further, in the above embodiment, the master apparatus determines whether or not it is necessary to update the firmware of the slave apparatus (step S81 in FIG. 22). In another embodiment, the slave apparatus may determine whether or not it is necessary to update the firmware of the slave apparatus. In this case, the slave apparatus may receive information of the requirement of the game (e.g., the game-related information) from the master apparatus, and may determine whether or not it is necessary to update the firmware of the slave apparatus, on the basis of the information. In another example, version information of firmware required for executing the game may be broadcasted from each master apparatus, and when the user selects one master apparatus from the master apparatus list, the slave apparatus may compare the version information of its own firmware to the version information broadcasted from the master apparatus, to determine whether or not it is necessary to update the firmware of the slave apparatus. Then, when it is necessary to update the firmware, the slave apparatus may display a confirmation screen as in FIG. 13, and when the user permits the update, the slave apparatus may download the firmware update program from the master apparatus.

Further, in the above embodiment, it is determined whether or not the current firmware of the slave apparatus satisfies the requirement of the game of which download play is to be performed (step S81 in FIG. 22). When the requirement is not satisfied, the firmware update program is transmitted from the master apparatus to the slave apparatus. In another embodiment, it may be determined whether or not the version of the current firmware of the slave apparatus is older than that of the firmware of the master apparatus. When the version of the current firmware of the slave apparatus is older than that of the firmware of the master apparatus, the firmware update program may be transmitted from the master apparatus to the slave apparatus.

Further, in the above embodiment, the firmware of the slave apparatus is updated according to need. However, the present invention is not limited to the update of the firmware, and is applicable to update of any basic software (system software, firmware, an operating system, and the like) that is required for executing an application program.

Further, in the above embodiment, the game program or the firmware update program is transmitted from one master apparatus to one slave apparatus. In another embodiment, the game program or the firmware update program may be transmitted from one master apparatus to a plurality of slave apparatuses.

Further, in another embodiment, when the firmware of the slave apparatus is updated, or when the slave apparatus downloads the slave apparatus game program from the master apparatus, it may be checked whether or not parental control has been set, and the update and the download may be restricted in accordance with the result of the checking. Parental control is for a parent to restrict the function of the game apparatus 10 in the case where the user of the game apparatus 10 is a child, and, for example, the parent can restrict execution of game software having an age requirement or can restrict connection to the Internet. Here, for example, immediately after it is determined as YES at step S44 in FIG. 20, it may be determined whether or not any parental control has been set. When any parental control has been set, the processing may proceed to step S48 only when a personal identification number for temporarily releasing the parental control is correctly inputted. Similarly, for example, immediately after step S29 in FIG. 19, it may be determined whether or not the game of which download play is to be performed is an object restricted by the parental control. When the game is an object restricted by the parental control, download or execution of a slave apparatus game program for the game may be permitted only when the personal identification number for temporarily releasing the parental control is correctly inputted.

Further, in the above embodiment, at step S68 in FIG. 21, on the basis of an instruction from the user, it is determined whether or not to accept participation of the slave apparatus that has applied for the invitation. In another embodiment, the participation may be automatically accepted without an instruction from the user.

Further, in the above embodiment, the master apparatus information is transmitted and received after the beacon is transmitted and received, and the master apparatus information includes the information on the master apparatus (the user's face image, the user name, the game ID and the title of the game of which participants for download play are invited, and the like). However, the present invention is not limited thereto. A part of the master apparatus information (the user's face image, the user name, and the like) may be included in the beacon, and the rest of the master apparatus information (the game ID and the title of the game of which participants for download play are invited, and the like) may be transmitted and received independently of the beacon.

In the above embodiment, after the firmware update process (slave apparatus) is performed at step S29 in FIG. 19, it is determined at step S30 whether or not the slave apparatus game program that is to be downloaded has been already stored in the slave apparatus game program storage area of the internal memory 35. In another embodiment, immediately before the firmware update process (slave apparatus) is performed at step S29 in FIG. 19, it may be determined whether or not the slave apparatus game program that is to be downloaded has been already stored in the slave apparatus game program storage area of the internal memory 35. When the slave apparatus game program has been already stored therein, the firmware update process (slave apparatus) may be skipped since it is sure that update of the firmware has been also previously performed.

In the above embodiment, the process at each step in the flowcharts shown in FIGS. 18 to 22 is performed by the CPU 311. However, the present invention is not limited thereto, and these processes may be divided to be performed by a plurality of processors. Alternatively, some of these processes may be performed by hardware.

While the invention has been described in detail, the foregoing description is in all aspects illustrative and not restrictive. It will be understood that numerous other modifications and variations can be devised without departing from the scope of the invention.

What is claimed is:

1. A communication system including a first information processing apparatus and second information processing apparatus that are configured to communicate with each other,
   the first information processing apparatus comprising:
      a first nonvolatile memory; and
      a first processing system including at least one processor, the first processing system being configured to perform operations comprising:
         storing, in the first nonvolatile memory, an application program for performing a predetermined communication process between the first information processing apparatus and the second information processing apparatus, the stored application program comprising a first part application program and a second part application program;
         transmitting the second part application program to the second information processing apparatus in accordance with a request from the second information processing apparatus; and
         performing, by executing the first part application program, the communication process with the second information processing apparatus,
   the second information processing apparatus comprising:
      a second nonvolatile memory; and
      a second processing system including at least one processor, the second processing system being configured to perform operations comprising:
         a first determining step to determine whether or not the second part application program has been already stored in the second nonvolatile memory;
         receiving the second part application program from the first information processing apparatus when it is determined that the second part application program has not been stored in the second nonvolatile memory;
         storing the received second part application program in the second nonvolatile memory; and
         performing the communication process with the first information processing apparatus by using the second part application program stored in the second nonvolatile memory,
      wherein the second processing system is further configured to perform operations comprising:
      storing the received second part application program such that the received second part application program is identifiable from another application program;
      displaying a list of application programs other than the received second part application program;
      selecting one application program from among the displayed application programs on the basis of an instruction from a user; and
      executing the selected application program.

2. The communication system according to claim 1, wherein, when the second processing system determines that the second part application program has been already stored in the second nonvolatile memory, the second processing system performs the communication process with the first information processing apparatus by using the already-stored second part application program.

3. The communication system according to claim 1, wherein the first information processing apparatus and the second information processing apparatus are portable information processing apparatuses that are configured to communicate with each other by short-range wireless communication.

4. The communication system according to claim 1, wherein
   the first information processing apparatus is an information processing apparatus that invites participation in the communication process with respect to another information processing apparatus,
   the second information processing apparatus is an information processing apparatus that participates in the communication process in response to the invitation, and
   when the second processing system determines that the second part application program has been already stored in the second nonvolatile memory, or when the received second part application program is stored in the second nonvolatile memory, the first processing system and the second processing system perform the communication process.

5. The communication system according to claim 1, wherein
   the first processing system is further configured to perform transmitting identification information of the second part application program, and
   the second processing system determines whether or not the second part application program has been already stored in the second nonvolatile memory, by comparing the identification information transmitted by the first processing system to identification information of the second part application program stored in the second nonvolatile memory.

6. The communication system according to claim 1, wherein
the second processing system is further configured to perform transmitting a request signal for requesting the second part application program to the first information processing apparatus, when the second processing system determines that the second part application program has not been stored in the second nonvolatile memory, and
when the request signal transmitted by the second processing system is received, the first processing system transmits the second part application program to the second information processing apparatus.

7. The communication system according to claim 1, wherein
the second processing system is further configured to perform:
a second determining step to determine whether or not another application program that is previously received by the second processing system and that is different from the application program has been stored in the second nonvolatile memory; and
deleting the other application program when the second processing system determines that the other application program has been stored in the second nonvolatile memory, and
after the deleting, the second processing system stores the received application program.

8. The communication system according to claim 1, wherein
the second processing system is further configured to perform operations comprising:
a third determining step to determine whether or not the second nonvolatile memory has a free space for storing the received second part application program; and
when the third determining step determines that the second nonvolatile memory does not have the free space, deleting the application program stored in the second nonvolatile memory, on the basis of a predetermined criterion until the free space is secured, and
storing the second part application program after the deleting.

9. The communication system according to claim 1, wherein
the second processing system is further configured to perform operations comprising:
receiving identification information of the second part application program from the first information processing apparatus; and
a fourth determining step to determine whether or not the received identification information agrees with the identification information of the second part application program stored in the second nonvolatile memory, and
when the fourth determining step determines that the received identification information agrees with the identification information of the second part application program stored in the second nonvolatile memory, performing the communication process with the first information processing apparatus by using the second part application program stored in the second nonvolatile memory.

10. The communication system according to claim 1, wherein the second part application program stored in the second nonvolatile memory is an application program that cannot be executed by the second information processing apparatus without being in communication with the first part application program on the first information processing apparatus from which the second part application program is received.

11. An information processing apparatus configured to communicate with another information processing apparatus, the information processing apparatus comprising:
a nonvolatile memory; and
a processing system including at least one processor, the processing system being configured to perform operations comprising:
a determining step to determine whether or not a second part application program for performing a predetermined communication process with said another information processing apparatus has been already stored in the nonvolatile memory, wherein an application program comprising a first part application program and the second part application program is stored in the another information processing apparatus;
receiving the second part application program from said another information processing apparatus when the determining step determines that the second part application program has not been stored in the nonvolatile memory;
storing the received second part application program in the nonvolatile memory; and
performing the communication process with said another information processing apparatus by using the second part application program stored in the nonvolatile memory in communication with the first part application program executed on the first information processing apparatus,
wherein the processing system is further configured to:
store the received second part application program such that the received second part application program is identifiable from another application program;
display a list of application programs other than the received second part application program;
select one application program from among the displayed application programs on the basis of an instruction from a user; and
execute the selected application program.

12. A non-transitory computer-readable storage medium having stored therein a communication program for causing a computer of an information processing apparatus having a nonvolatile memory to perform operations comprising:
a determining step to determine whether or not a second part application program for performing a predetermined communication process with another information processing apparatus has been already stored in the nonvolatile memory, wherein an application program comprising a first part application program and the second part application program is stored in the first information processing apparatus;
receiving the second part application program from the other information processing apparatus when the determining step determines that the second part application program has not been stored in the nonvolatile memory;
storing the received second part application program in the nonvolatile memory; and
performing the communication process with the other information processing apparatus by using the second part application program stored in the nonvolatile memory in communication with the first part application program executed on the first information processing apparatus,
wherein the communication program further causes the computer to:

store the received second part application program such that the received second part application program is identifiable from another application program;

display a list of application programs other than the received second part application program;

select one application program from among the displayed application programs on the basis of an instruction from a user; and execute the selected application program.

13. A communication method for performing a predetermined communication process between a first information processing apparatus and a second information processing apparatus that are configured to communicate with each other, the communication method comprising:

the second information processing apparatus performing a determining step to determine whether or not a second part application program for performing the communication process with the first information processing apparatus has been already stored in a nonvolatile memory of the second information processing apparatus, wherein an application program comprising a first part application program and the second part application program is stored in the first information processing apparatus;

the first information processing apparatus transmitting the second part application program to the second information processing apparatus in accordance with a request from the second information processing apparatus, when the determining step determines that the second part application program has not been stored in the nonvolatile memory;

the second information processing apparatus receiving the second part application program from the first information processing apparatus;

the second information processing apparatus storing the received second part application program in the nonvolatile memory; and the second information processing apparatus performing the communication process with the first information processing apparatus by using the second part application program stored in the nonvolatile memory in communication with the first part application program executed on the first information processing apparatus, wherein the communication method further comprises:

the second information processing apparatus storing the received second part application program such that the received second part application program is identifiable from another application program;

the second information processing apparatus displaying a list of application programs other than the received second part application program;

the second information processing apparatus selecting one application program from among the displayed application programs on the basis of an instruction from a user; and the second information processing apparatus executing the selected application program.

* * * * *